United States Patent [19]

Nigawara et al.

[11] Patent Number: 5,258,652
[45] Date of Patent: Nov. 2, 1993

[54] DISTRIBUTED PLANT CONTROL SYSTEM

[75] Inventors: Seiitsu Nigawara; Masayuki Fukai, both of Hitachi; Akira Sugano, Katsuta; Atsushi Takita, Mito, all of Japan

[73] Assignee: Hitachi, Ltd., Tokyo, Japan

[21] Appl. No.: 921,386

[22] Filed: Jul. 30, 1992

Related U.S. Application Data

[63] Continuation of Ser. No. 678,188, Mar. 29, 1991, abandoned, which is a continuation of Ser. No. 279,122, Dec. 2, 1988, abandoned.

[30] Foreign Application Priority Data

| Jan. 8, 1988 | [JP] | Japan | 63-1243 |
| May 10, 1988 | [JP] | Japan | 63-111665 |
| Dec. 7, 1988 | [JP] | Japan | 63-307552 |

[51] Int. Cl.⁵ ............................................. H02J 3/00
[52] U.S. Cl. ................................. 307/38; 307/17; 307/19; 307/29
[58] Field of Search ............... 361/172, 191, 192, 193; 307/11, 17, 18, 19, 23, 29, 38, 39, 40, 41, 113, 115; 340/825.05, 825.07, 825.22, 825.23, 310 R, 310 A, 310 CP; 364/138, 140, 141, 149

[56] References Cited

U.S. PATENT DOCUMENTS

| 3,500,056 | 3/1970 | Riley | 307/42 |
| 4,434,390 | 2/1984 | Elms | 318/473 |
| 4,467,314 | 8/1984 | Weikel et al. | 340/310 A |
| 4,609,868 | 9/1986 | Ferrari | 324/158 MG |
| 4,745,744 | 5/1988 | Cherry et al. | 60/368 |
| 4,831,582 | 5/1989 | Miller et al. | 364/900 |
| 4,835,699 | 5/1989 | Mallard | 364/470 |
| 4,835,706 | 5/1989 | Asahi | 364/492 |
| 4,985,970 | 1/1990 | Krenkel et al. | 28/141 |

*Primary Examiner*—Jeffrey A. Gaffin
*Attorney, Agent, or Firm*—Antonelli, Terry, Stout & Kraus

[57] ABSTRACT

A distributed control system for a plant includes an electric equipment room for supplying electric power to a plurality of field apparatuses constituting parts of the plant by way of a plurality of operation terminals. Apparatuses for controlling the function units are provided distributively in the field in which the field apparatuses to be controlled are installed. Operation terminals to be controlled by the control apparatus are installed in the field.

26 Claims, 19 Drawing Sheets

| NO | LIST OF OPERATION TERMINALS | NUMBER |
|---|---|---|
|  | MILL-A CONTROL APPARATUS |  |
| 1 | COAL FEEDER-A | 1 |
| 2 | COAL FEEDER-A SPEED REGULATOR | 1 |
| 3 | MILL-A | 1 |
| 4 | MILL-A LUBRICANT PUMP | 1 |
| 5 | A-PAF | 1 |
| 6 | A-PAF INLET DAMPER | 1 |
| 7 | MILL-A EXIT DAMPER | 6 |
| 8 | MILL-A HOT AIR DAMPER | 1 |
| 9 | MILL-A COLD AIR DAMPER | 1 |
| 10 | COAL GATE | 1 |

FIG. 9

| NO | LIST OF OPERATION TERMINALS | NUMBER |
|---|---|---|
|  | A-FDF CONTROL APPARATUS |  |
| 1 | A-FDF | 1 |
| 2 | A-FDF AUXILIARY LUBRICANT PUMP | 1 |
| 3 | A-FDF ENTRANCE VANE | 1 |
| 4 | A-FDF EXIT DAMPER | 1 |
| 5 | A-FDF EXIT COMMUNICATION DAMPER | 1 |
|  |  |  |
|  |  |  |
|  |  |  |
|  |  |  |

FIG. 10

| NO | LIST OF OPERATION TERMINALS | NUMBER |
|---|---|---|
|  | A-IDF CONTROL APPARATUS |  |
| 1 | A-IDF | 2 |
| 2 | A-IDF AUXILIARY LUBRICANT PUMP | 2 |
| 3 | A-IDF FLUID JOINT | 2 |
| 4 | A-IDF EXIT DAMPER | 2 |
| 5 | A-IDF ENTRANCE DAMPER | 2 |
|  |  |  |
|  |  |  |
|  |  |  |

FIG. 11

| NO | LIST OF OPERATION TERMINALS | NUMBER |
|---|---|---|
|  | FEED WATER PUMP-A SYSTEM CONTROL APPARATUS |  |
| 1 | A-BFP·T-GOVERNOR | 1 |
| 2 | A-BFP·T-HIGH PRESSURE MSV | 1 |
| 3 | A-BFP·T-LOW PRESSURE MSV | 1 |
| 4 | A-BFP·T-DISCHARGE VALVE | 1 |
| 5 | A-BFP·T-VACUUM BREAKER | 1 |
| 6 | A-BFP·T-AUXILIARY STOP VALVE | 1 |
| 7 | A-BFP·T-GRAND STEAM VALVE | 1 |
| 8 | A-BFP·T-GRAND STEAM DISCHARGE VALVE | 1 |
| 9 | A-BFP·T-MAIN LUBRICANT PUMP | 2 |
| 10 | A-BFP·T-EMERGENCY LUBRICANT PUMP | 1 |
| 11 | A-BFP·T-TURNING MOTOR | 1 |
| 12 | A-BFP·T-BEARING LUBRICANT TEMPERATURE CONTROL VALVE | 1 |
| 13 | A-BFP EXIT VALVE | 1 |
| 14 | A-BFP-BP ENTRANCE VALVE | 1 |
| 15 | A-BFP BOOSTER PUMP | 1 |
| 16 | A-BFP RECIRCULATION VALVE | 1 |
| 17 | A-BFP·T-HIGH PRESSURE MSV DRAIN VALVE | 2 |
| 18 | A-BFP·T-LOW PRESSURE MSV DRAIN VALVE | 2 |
| 19 | A-BFP·T-CASING DRAIN VALVE | 1 |
| 20 | A-BFP·T-EXHAUST HOOD DRAIN VALVE | 1 |
| 21 | A-BFP·T-LOW PRESSURE STEAM TUBE DRAIN VALVE | 1 |

FIG. 12

| NO | LIST OF OPERATION TERMINALS | NUMBER |
|---|---|---|
|  | FEED WATER PUMP-C SYSTEM CONTROL APPARATUS |  |
| 1 | M-BFP | 1 |
| 2 | M-BFP AUXILIARY LUBRICANT PUMP | 1 |
| 3 | FEED WATER FLOW REGULATING VALVE | 1 |
| 4 | M-BFP RECIRCULATION VALVE | 1 |
| 5 | M-BFP-BP INLET VALVE | 2 |
| 6 | M-BFP OUTLET VALVE | 1 |
| 7 | BFP WARMING VALVE | 1 |

FIG. 13

| NO | LIST OF OPERATION TERMINALS | NUMBER |
|---|---|---|
|  | TURBINE CONTROL APPARATUS |  |
| 1 | CONTROL VALVE (CV) | 4 |
| 2 | MSV | 2 |
| 3 | ICV | 2 |
| 4 | ICV BYPASS VALVE | 2 |
| 5 | MSV BYPASS VALVE (FOR WARM UP) | 2 |
| 6 | HIGH PRESSURE TURBINE EXIT VALVE | 1 |
| 7 | CV QUICK CLOSE VALVE | 1 |
| 8 | ICV QUICK CLOSE VALVE | 2 |

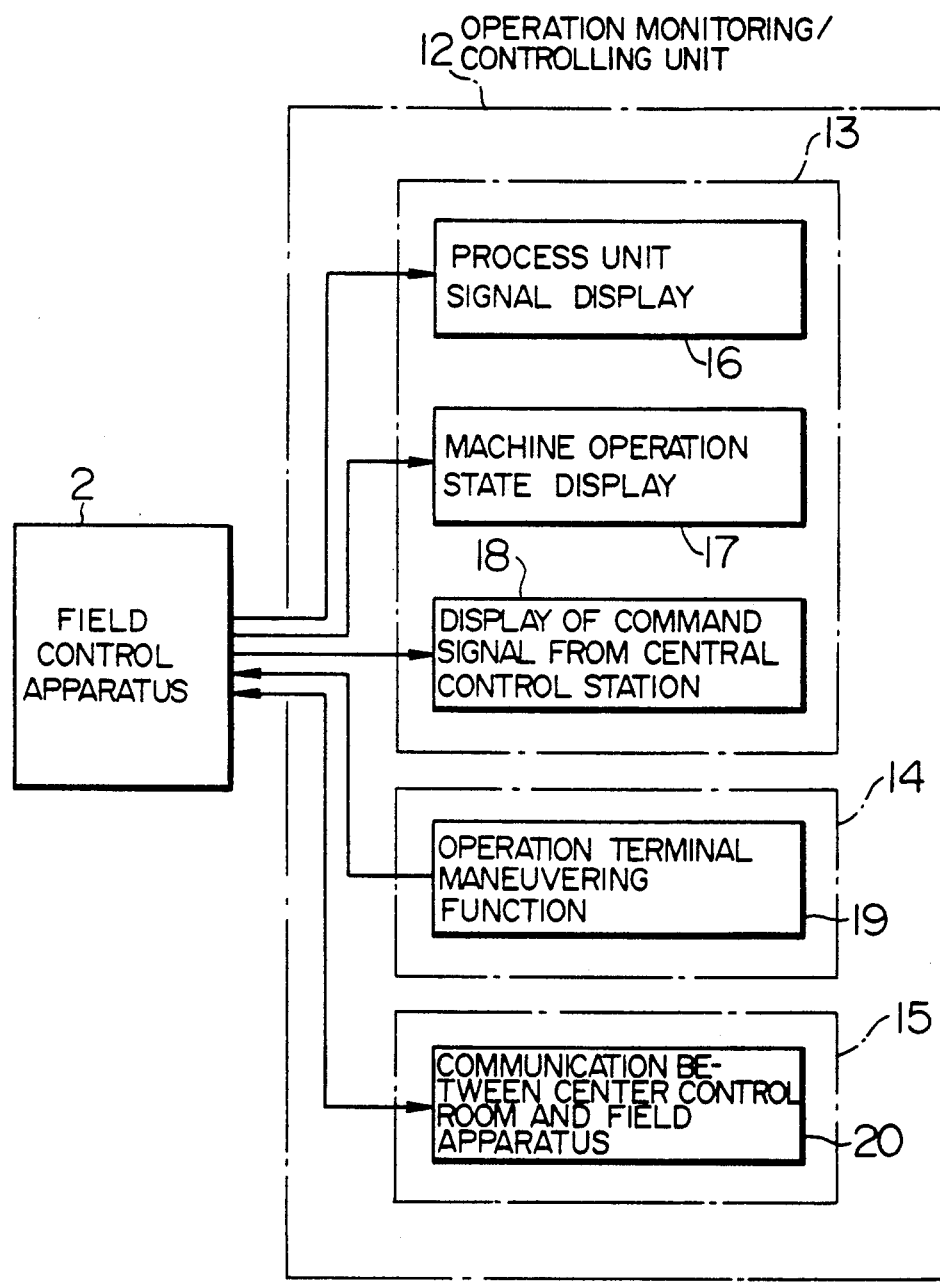

[5,258,652]

DISTRIBUTED PLANT CONTROL SYSTEM

This application is a continuation of application Ser. No. 678,188, filed Mar. 29, 1991 now abandoned, which is a continuation of application Ser. No. 279,122 filed Dec. 2, 1988, now abandoned.

BACKGROUND OF THE INVENTION

The present invention relates generally to a distributed or decentralized plant control system and more particularly to such a distributed control system for a plant in which various control apparatuses are distributed in the field where various plant machines, devices, instruments, tools or the like (also referred to as electromechanical units, machine units or field apparatus in more general terms) to be controlled by the control apparatuses are installed.

In the present state of the art, the control systems for various plants inclusive of thermal power plants and others tend increasingly to be realized by resorting to the use of digital technology. A typical example of such digital plant control systems is disclosed in Japanese Patent Application Laid-Open No. 21503/1986 (JP-A-61-21503). This known control system is implemented in the form of a centralized control system in which various electromechanical units installed in the field within a plant are placed under the control of a control system installed at the central station of the plant. For more particulars of the whole arrangement of this known control system designed for a thermal power plant, reference may be made to the above mentioned publication.

In the centralized control system, any abnormality taking place in the control system would exert adverse influence to the plant operation over an extensive range. Under the circumstance, there arises a tendency for decentralizing the plant control system. An example of such decentralized or distributed plant control system is disclosed in JP-A-58-66111. In this known distributed plant control system, a high-rank or host computer is installed in a central control station room in which operators are resident, while field control apparatuses are installed in the field in the vicinity of the electromechanical units to be controlled thereby, wherein the host computer and the individual field control apparatuses are interconnected through a medium of a loop-type data highway system.

A plant of any type may be divided into three major stations for convenience' sake of consideration. One of them is a central control station including a central control room in which a control and monitoring console or panel for supervision, a host computer, a general control system for controlling and monitoring the whole plant in a consolidated fashion and the like are installed. The second station is constituted by the so-called field control station disposed in association with a plurality of the electromechanical units to be controlled. The third station is a so-called electrical equipment room in which power supply equipment is accommodated for supplying electric energy to the control system and the computer in the central station as well as to the electromechanical units, operation terminals for operating the electromechanical units and the operation terminal controllers installed in the field by tapping from a power source external of the plant (outdoor power supply source) or from an indoor power supply source in the case of an electric power plant.

In the known control system disclosed in JP-A-58-66111 briefed above, the control system covering the central control station and the field control stations is certainly implemented in the form of the distributed or decentralized control system. It is noted however that decentralization is not realized for the power supply system intervening between the electrical equipment room and the field stations. Usually, the electrical equipment room accommodates therein buses for tapping electric power from an external power supply source, transformers for lowering the source voltage to appropriate voltage levels, circuit breakers for interconnecting the buses, switchgears provided on the load basis, a control center for controlling the on/off operation of the circuit breakers and the switchgears. The electrical equipment room of this nature is inherently ill-fitted for decentralization of the control system. As the consequence, there arise problems mentioned below.

(1) For effectuating the closing/opening control (on/off control) of the switchgears from the central control station, process signals available from the loads installed in the field are required in addition to the on/off command signals from the host computer installed in the central station. To this end, a signal transmission path must be established not only between the electrical equipment room and the central control station but also between the former and the field stations, which will neccessarily involve an enormous expenditure inclusive of the signal cable cost and installation cost. Besides, since the signal transmission lines and the power transmission lines are installed in juxtaposition, reliability of the control will be degraded due to disturbance by generation of noise and other causes, not to speak of complexity involved in providing the separate lines or cables for the power and signal transmissions.

(2) Even when the control apparatuses are distributively installed in the field, the central control station or room will have to be provided which is designed for accommodating such instruments, tools, display units, recorders and others as required for monitoring and controlling operations of various electromechanical units constituting the plant in order to supervise and control the plant operation in a consolidated manner. Consequently, when an electromechanical unit installed in the field has to be run for trial, serviced or inspected for maintenance or for other purposes, the field operator in charge must every time consult the operator resident in the central control station room to obtain appropriate commands and information from the central station, which is of cource considerably inconvenient.

SUMMARY OF THE INVENTION

It is therefore an object of the present invention to provide a decentralized or distributed control system for a plant in which operation terminals of an electric power supply system for operating the electromechanical units are distributed in the field in coordination to the decentralization of the control system.

Another object of the present invention is to provide a distributed control system for a plant which permits operators to monitor and control operations of the electromechanical units to be controlled in their presence in the field.

A further object of the present invention is to provide a distributed control system for a plant which permits communication between the field stations and the central control station while allowing distribution of the control apparatuses in the field.

In view of the above and other objects which will be more apparent as description proceeds, it is proposed according to an aspect of the present invention that the control apparatuses for controlling the electromechanical units installed in the field are disposed in the vicinity thereof, and that operation terminal units for controlling the power supply from the electrical equipment station (room) to the electromechanical units to be controlled are disposed in close vicinity of the associated electromechanical units, respectively. More specifically, the operation terminal such as, for example, switchgear as well as the controller therefor are provided in the vicinity of the associated field electromechanical unit, respectively, whereby transmission path provided heretofore between the electrical equipment room and the field stations are rendered unnecessary, while assuring a high reliability in the control.

According to another aspect of the present invention, each field control apparatus for controlling the associated electromechanical unit to be controlled is installed in the vicinity thereof, wherein each control apparatus is provided with monitoring means and controlling means for monitoring and controlling the operation or running state of the associated electromechanical unit independent of the central control station, as occasion requires. With this arrangement, information about the operating states of the electromechanical units is available straightforwardly to the operator, who can thus control the electromechanical units on the field basis in their presence, whereby more positive and reliable man-machine communication can be established.

According to still another aspect of the present invention, the field control station located in the vicinity of the field electromechanical units to be controlled is made up with means for monitoring and controlling the associated electromechanical units and additionally with means for conducting communication with the central control station so that control of the field electromechanical units can be performed through cooperation with the central control station, for thereby ensuring coordinated operations among the field control apparatuses.

BRIEF DESCRIPTION OF THE DRAWINGS

FIGS. 8 to 13 are views showing groups of operation terminals for electromechanical units of a power plant controlled by the associated field control apparatuses, respectively, the operation terminal units being classified on the function basis;

FIG. 17 is a block diagram illustrating various functions of the operation monitoring and maneuvering unit shown in FIG. 16;

DESCRIPTION OF THE PREFERRED EMBODIMENTS

Figure 1:
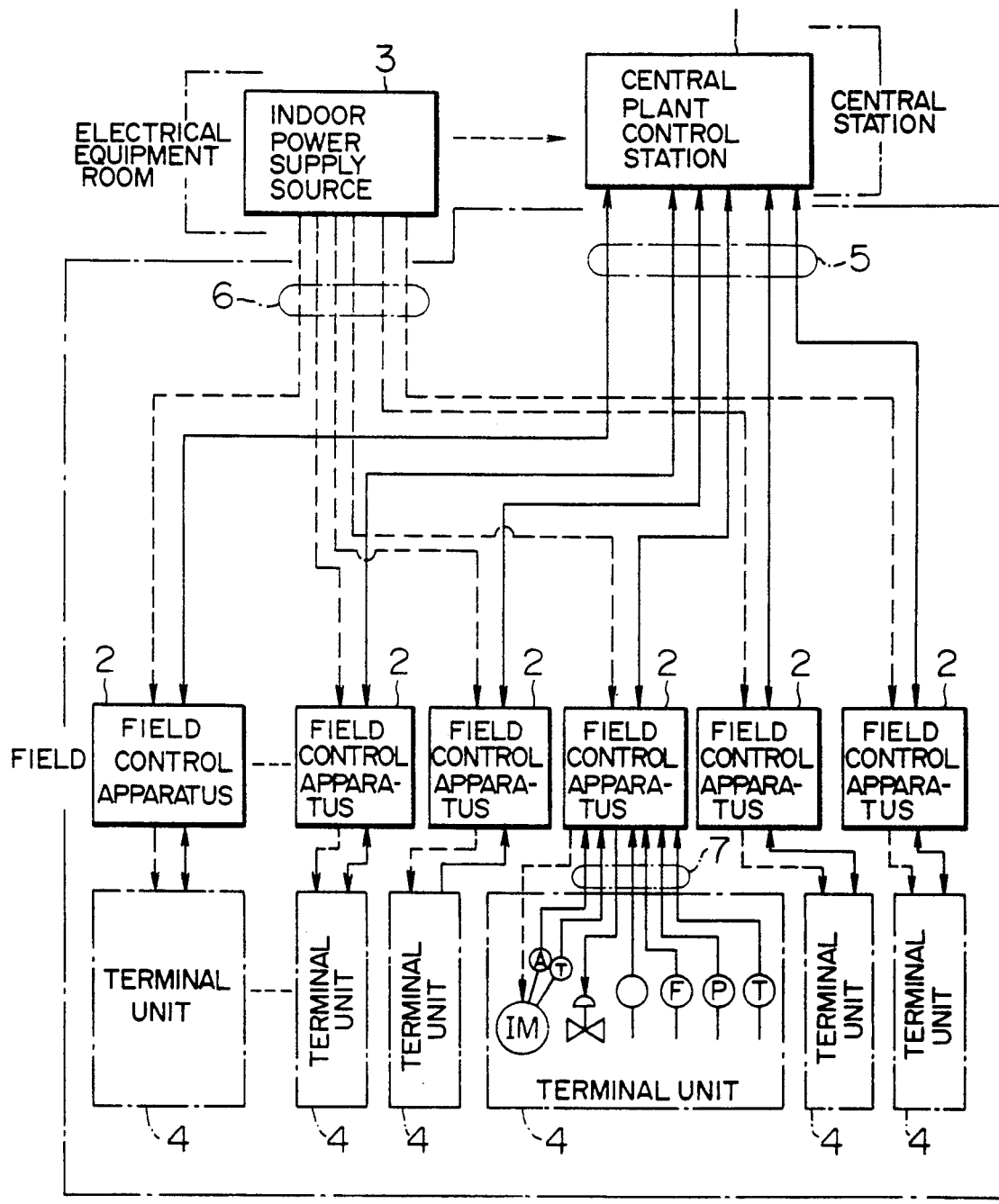
FIG. 1 is a system diagram showing a general arrangement of a distributed control system for a plant according to an embodiment of the present invention.

FIG. 1 shows schematically a general arrangement of a power plant to which the distributed or decentralized plant control system according to the present invention is applied. The power plant may be considered to be generally divisible into three main stations for convenience sake of description, i.e. a central plant control station, field control stations and an electrical equipment station or room, as mentioned hereinbefore. In FIG. 1, a reference numeral 1 denotes a central plant control station which serves to collect various information about situations or states prevailing at various locations within the plant and send commands to low-rank control apparatuses installed as distributed in the field (referred to as field control apparatuses). Reference numerals 2 denote the field control apparatuses distributed in the field in correspondence with terminal units into which the field electromechanical units, operation terminals for operating the associated electromechanical units and the terminal controllers for controlling the operation terminals are appropriately grouped. A reference numeral 3 denotes an indoor power supply equipment installed within the electrical equipment room for supplying electric powers to the various parts constituting the plant. Reference numerals 4 denote collectively the terminal units each including electromechanical units, operation terminals for operating the electromechanical units, controllers for controlling the operation terminals, detectors for detecting plant process quantities and others. A reference numeral 5 designates collectively signal transmission lines provided between the central plant control station and the field control apparatuses or stations, wherein the signal transmission line may preferably be realized in the form of an optical cable using optical fibers. A numeral 6 designates collectively power cables for supplying electric power to the terminal units 4. Finally, reference numeral 7 collectively designates cables which interconnect the process detectors, the operation terminal controllers and others of the terminal units 4 with the associated field control apparatuses 2, respectively. With the arrangement described above, the process signals produced by the process detectors (such as a flow meter F, a pressure meter P, a thermometer T, an ampere meter A and others) are supplied to the inputs of the distributed field control apparatuses 2 to be thereby conditioned or otherwise processed.

The information signals thus available from the outputs of the field control apparatuses 2 are sent to the central plant control station 1 by way of the optical cables 5. On the other hand, the central plant control station 1 generates control commands on the basis of the information supplied thereto and sends out operation commands to the distributed field control apparatuses 2 which respond to the operation commands by controlling the associated terminal units 4. Most of the plant controls of concern are directed to the on/off control of switchgears for controlling the electric power supply to motors, coils and the like. Taking as example a thermal power plant, varieties of pumps, fans, pulverizing mills or the like auxiliary machines of large size are adapted to be started or stopped by closing or opening the switchgears such as switches, circuit breakers or the like installed in the power supply lines leading to the driving motors provided in association with the electromechanical or machine units mentioned above. Further, in some applications, the operation terminals for regulating the process quantities such as water level, flow, pressure, temperature and the like may be constituted by a regulating valve. In that case, the on/off control, position control or backward/forward rotation control of the regulating valve may be carried out through the on/off (close/open) control performed by a terminal controller for the switchgear (an operation terminal) installed in the power supply line leading to a drive motor provided in association with the regulating valve (an electromechanical unit). By way of example, in the case of a switching valve which can assume no intermediate opening position, the switchgear installed in the power supply line leading to the coil associated with the switching valve undergoes the on/off control.

Figure 2:
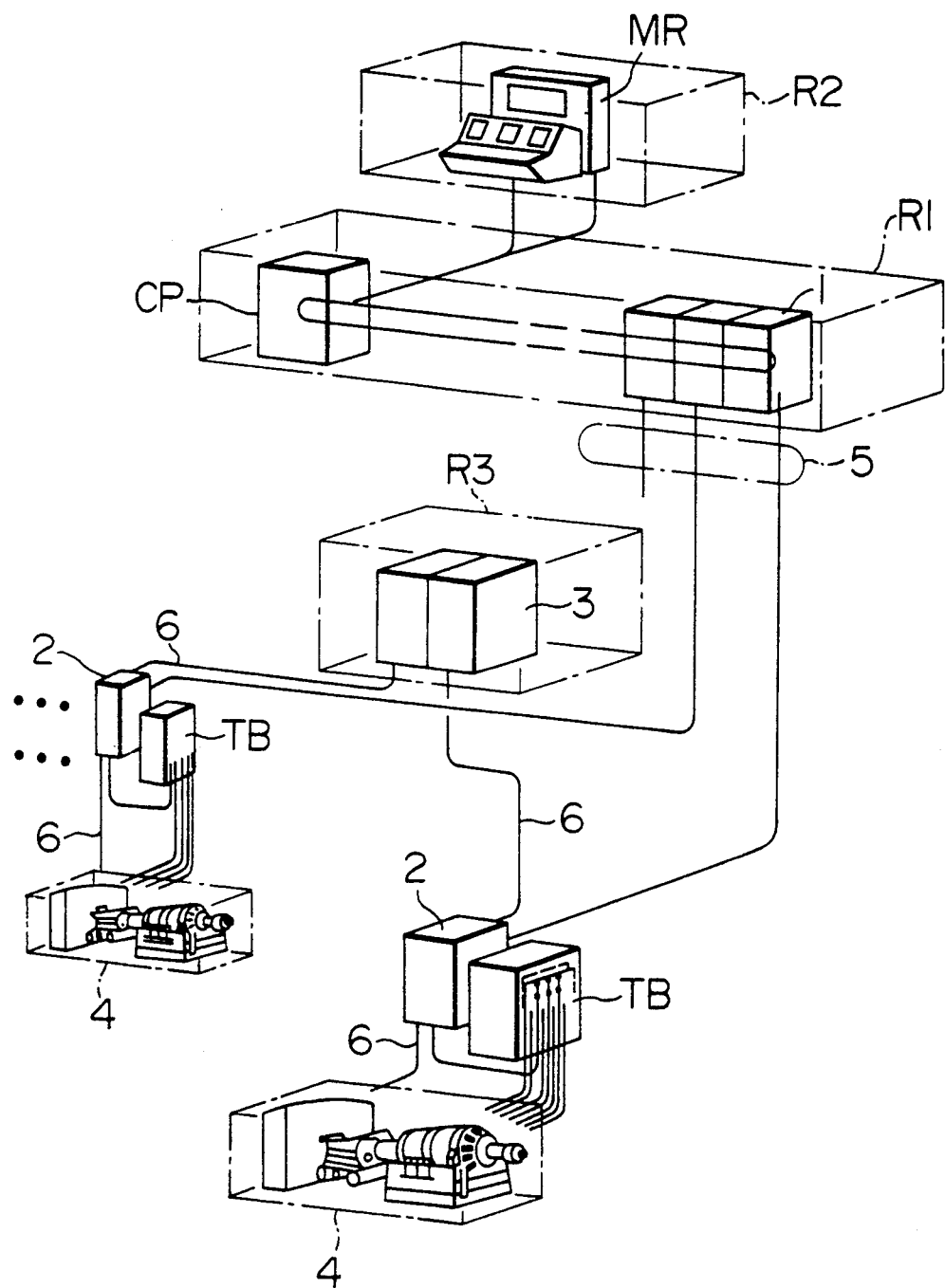
FIG. 2 is a view showing a pictorial representation of the control-distributed plant system shown in FIG. 1.

FIG. 2 is a view illustrating pictorially the positional relationships among the various parts of the plant and the distributed control system shown in FIG. 1. In the central station, there is provided a central control equippment room R1 accommodating therein the central plant control system 1 and a computer CP connected thereto by way of a network and a central control room R2 accommodating a monitoring console MR for allowing the resident operators to monitor or supervise the plant operating states. In the past, the electrical equipment room R3 accommodating the indoor power supply equipment 3 was installed in many cases in the central station in view of convenience for the operators in charge of maintenance and maneuvering. In contrast, according to the present invention, the electric equipment room R3 is designed to accommodate various buses, transformers, circuit breakers for the buses and others. Thus, the electrical equipment room R3 is separately installed at an appropriate location within the plant campus. The field electromechanical units are appropriately classified into groups or the terminal units 4, respectively, as mentioned hereinbefore, for which the field control apparatuses 2 are provided, respectively. The distributed field control apparatuses 2 and the central plant control station 1 are mutually communicated through the medium of optical cables 5, while the power cables 6 are provided between the indoor power supply station 3 and the field control apparatuses 2., Ordinarily, the field control apparatus 2 communicates with the operation terminal controllers and the various detectors of the associated terminal units by way of a terminal box TB for signal transfer (reception/transmission).

Figure 3:
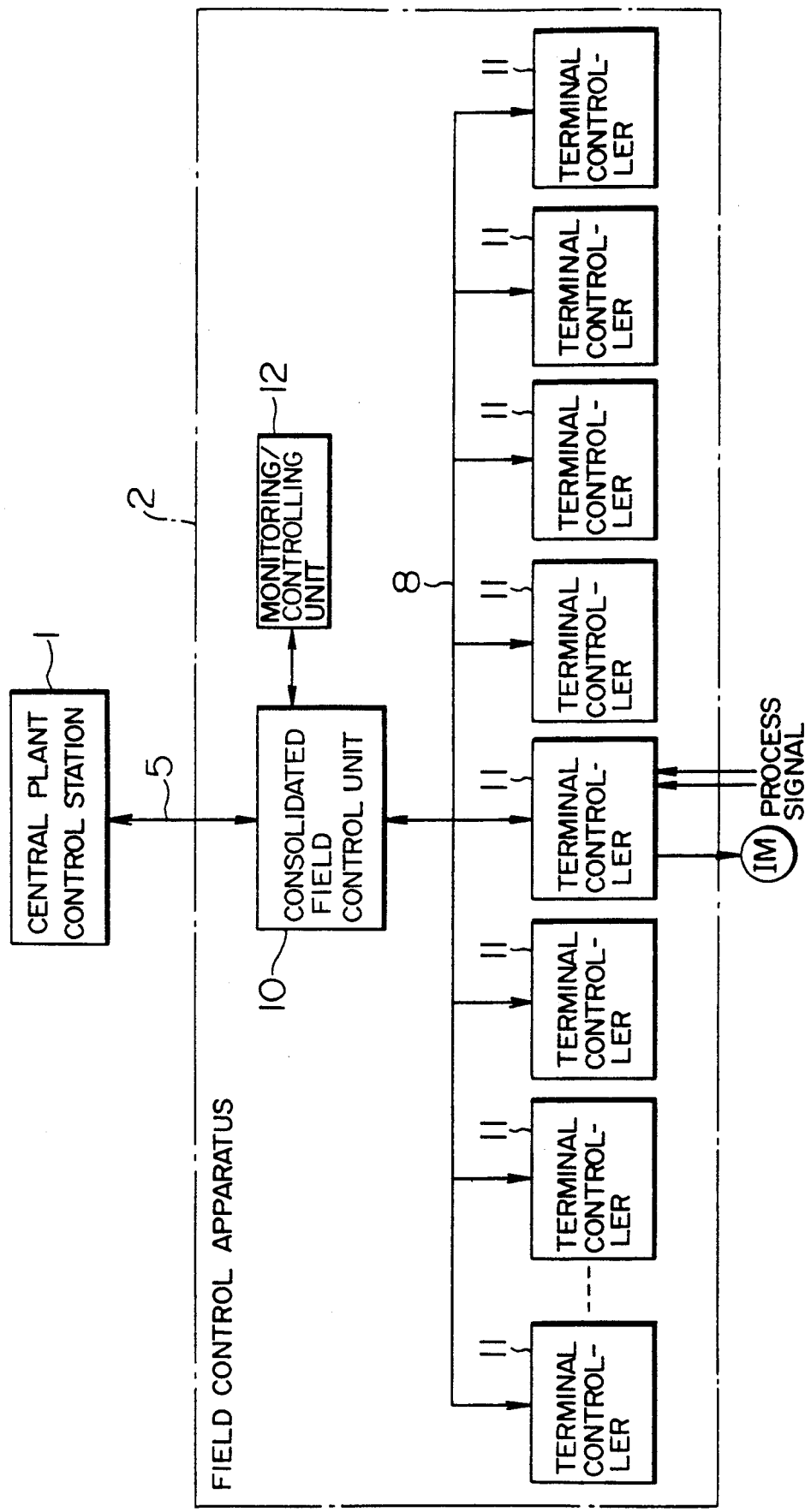
FIG. 3 is a block diagram showing schematically an arrangement of a field control station according to an embodiment of the present invention.

Next, referring to FIG. 3, description will be directed to a general arrangement of the field control apparatus 2 shown in FIG. 1.

In FIG. 3, reference numeral 1 again denotes the central plant control station, 2 denotes one of the distributed field control apparatuses, 5 denotes the optical cable for the signal transmission/reception provided between the central plant control station 1 and the field control apparatus 2, and a reference numeral 8 denotes a multiplex signal transmission cable for allowing signal transfers between the operation terminal controllers 11 for controlling individually the associated electromechanical units 4 and a consolidated field control unit 10 for controlling the individual operation terminal controllers 11 in a consolidated fashion. Finally, a reference numeral 12 denotes an operation monitoring and controlling unit having function for displaying the process information as well as the operating states of the electromechanical units and machine units, function for controlling the operation terminals and other functions. The field control apparatus 2 is intended to be installed in the field. More specifically, by dividing the whole plant into sections or fields in accordance with a rational concept, the field control apparatus 2 is provided for each of these sections or fields. Of course, the plant may be divided in any suitable manner. In the case of the thermal power plant, by way of example, it may be reasonable from the practical view point to divide the plant into the sections or fields for the fuel system, an air system, a feed water system, a turbine system and others, respectively.

Figure 4:
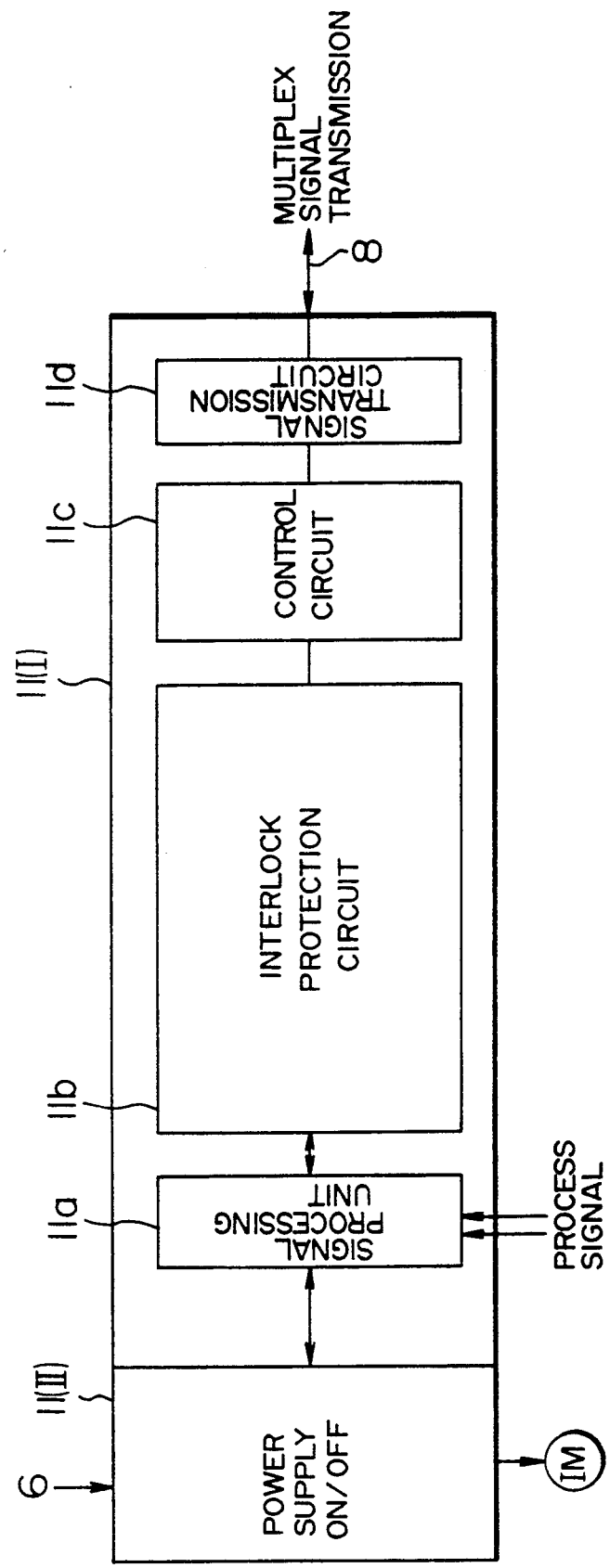
FIG. 4 is a view showing a structure of an operation terminal controller according to an embodiment of the present invention.

Now, referring to FIG. 4, description will be directed to the terminal controller 11. Globally, this terminal controller 11 can be functionally divided into two main function units. One is a function unit 11(I) which may be referred to as the intrinsic controller including a control circuit 11c, an interlock protection circuit 11b, a signal transmission circuit 11d and a signal processor 11a. The other function unit of the operation terminal controller 11 is a power on/off control function unit 11(II) also referred to as the breaker/switchgear control function unit. In this connection, it should be mentioned that the interlock protection circuit 11b and the power supply on/off control function unit 11(II) were accommodated within the electric equipment room 3 in the case of the prior art system. In the operation terminal controller 11, the process signal of the associated field electromechanical or machine unit is supplied as the input to the signal processing circuit 11a to be utilized by the interlock protection circuit 11b (the circuit for protecting the associated electromechanical unit) and the control circuit 11c (for controlling the associated electromechanical unit), as occasion requires. As the result of this, the power supply on/off signals (for closing or opening a motor driven valve, starting or stopping the auxiliary machine unit or other purpose) is again outputted to the power supply on/off control function unit 11(II) through the signal processor 11a. The process signal statuses as well as operating states of the interlock protection circuit 11b and the control circuit 11c are sent to the consolidated field control unit 10 of higher rank by way of the signal transmission circuit 11d and hence to the central plant control station 1 to be utilized for the consolidated monitoring and control of the plant. Further, when an electromechanical unit of concern has to be controlled in coordination with other electromechanical units of the plant, control commands are issued from the high-rank field control unit 10 to the associated operation terminal controller 11 through the signal transmission circuit 11d. One of the important features of the present invention can be seen in the control function unit 11(I) and the power supply on/off unit 11(II) are integrally combined in the form of the operation terminal controller 11 which is provided for each of the electromechanical or machine units and that the operation terminal controller is provided in the vicinity of the field electromechanical unit to be controlled thereby. Parenthetically, the interlock protection circuit 11b shown in FIG. 4 is often termed the control center as well, wherein combination thereof with the power supply on/off operation unit 11(II) is sometimes referred to as the switchgear unit in a more general term.

Figure 5:
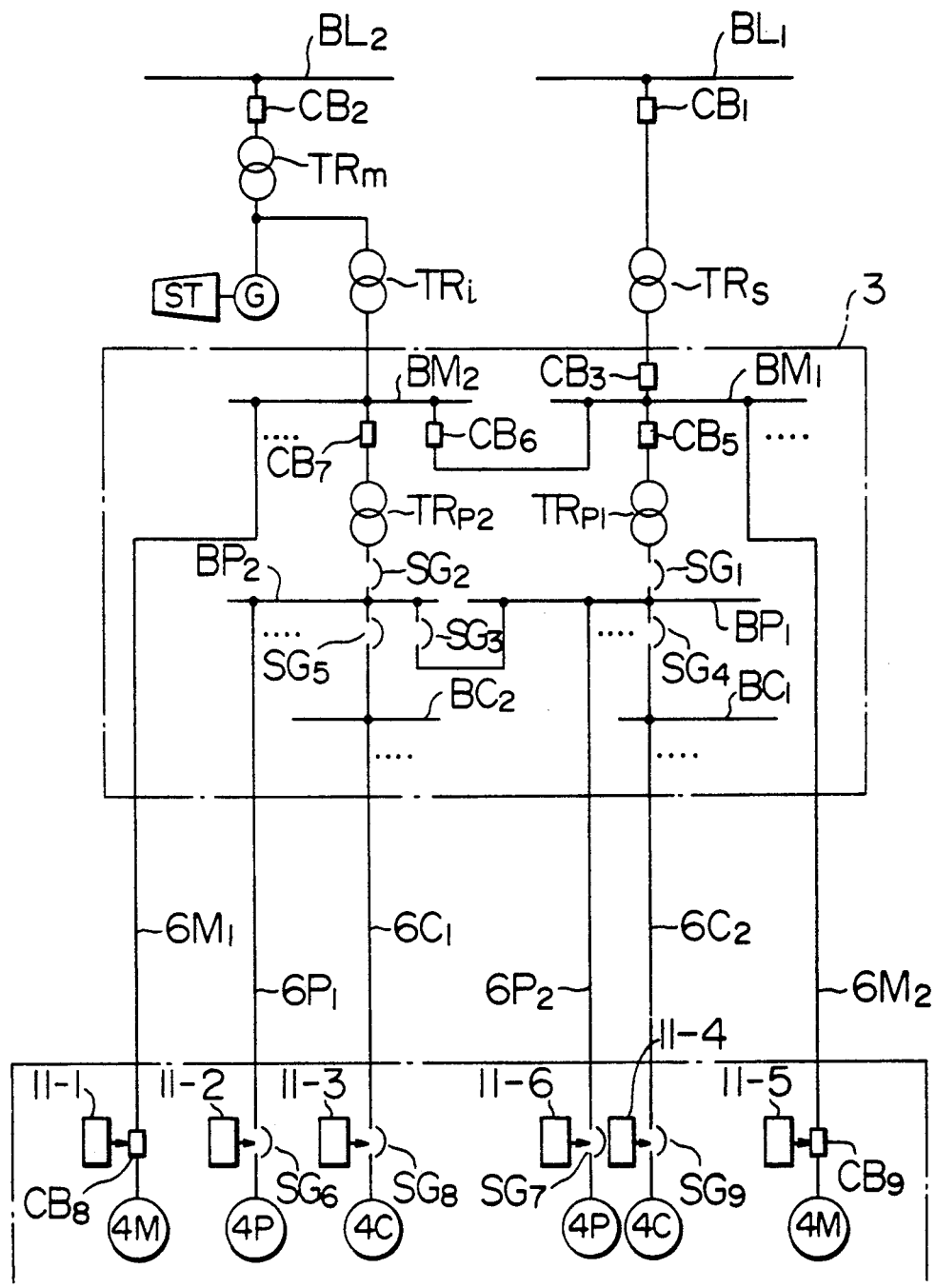
FIG. 5 is a circuit diagram showing a circuit configuration of an indoor power supply system.

In the control-decentralized plant system according to the present invention, the indoor power supply station 3 is implemented in such a configuration as shown in FIG. 5. In this figure, reference symbols BL and BM denotes representatively buses, CB denotes representatively a circuit breaker, TR denotes representatively a transformer and SG denotes representatively a switchgear. A circuit portion indicated as enclosed by a double-dot line is installed within the electric equipment room R3 from which the power supply is conducted to the field terminal units 4. More specifically, in the indoor power supply station 3, an electric power is supplied to a metal-clad bus $BM_1$ from the system bus $BL_1$ through the circuit breaker $CB_1$, a starting transformer $TR_s$ and a circuit breaker $CB_3$. In the electric power plant, there exist a prime mover ST and an electric generator G. Accordingly, in this case, the electric power may be supplied to the metal-clad bus $BM_2$ from the electric generator G through a house transformer $TR_i$. Of course, the output of the house generator G may be fed to the system bus $BL_2$ through a main transformer $TR_m$ and a circuit breaker $CB_2$. When two power receiving systems are provided as in the case of the station shown in FIG. 5, a bus interconnecting circuit breaker $CB_6$ may be installed between the metal-clad buses $BM_1$ and $BM_2$ so that the power can be received from any one of these buses. From the metal-clad bus $BM_1$ or $BM_2$, electric power of lower level is supplied to a power center bus $BP_1$ or $BP_2$ through the circuit breaker $CB_5$ or $CB_7$, a power center transormer $TR_{p1}$ or $TR_{p2}$ and a switchgear $SG_1$ or $SG_2$, respectively. The power center buses $BP_1$ and $BP_2$ are interconnected by a switchgear SG as in the case of the metal-clad buses. From the power center bus $BP_1$ or $BP_2$, power is supplied to a control center bus $BC_1$ or $BC_2$ through a switchgear $SG_4$ or $SG_5$. Incidentally, it should be mentioned that the terms "circuit breaker" and "switch-gear" are used herein to represent switch devices of substantially identical function, being understood that the device of a relatively small size is termed the switchgear.

As will be seen in FIG. 5, the electric equipment room 3 accommodates therein various buses of different voltage levels, circuit breakers and switch-gears for interconnecting the buses and the transformers for stepping down the voltages, wherein the power cables generally denoted by numeral 6 are led out from the buses in accordance with the load capacities of the associated electromechanical units installed in the field. By way of example, large capacity loads 4M are supplied with electric power from the high-voltage metal-clad buses $BM_2$ and $BM_1$ through the power cables $6M_1$ and $6M_2$ and the circuit breakers $CB_8$ and $CB_9$, respectively. On the other hand, power supply to medium capacity loads 4P is effectuated from the power center buses $BP_1$ and $BP_2$ through the power cables $6P_1$ and $6P_2$ and the switchgears $SG_6$ and $SG_7$, respectively. Further, the power supply to loads 4C of a small capacity is made from the control center buses $BC_1$ and $BC_2$ by way of the power cables $6C_1$ and $6C_2$ and the switchgears $SG_8$ and $SG_9$, respectively. In this conjunction, a characteristic feature of the invention can be seen in that the control centers for controlling the closing/opening of the individual loads as well as the associated circuit breakers and the switchgears which have heretofore been installed within the electric equipment room R3 are disposed in the vicinity of the associated electromechanical units installed in the field, respectively. In FIG. 5, the operation terminal controller imparted with the function of the control center is again designated representatively by the reference numeral 11. Incidentally, it should be mentioned that an integrally unified structure of the control center and the switchgear is sometimes referred to as the switchgear unit. In this sense, it may be said that the switchgear unit is disposed in the field according to the teaching of the present invention.

Figure 6A:
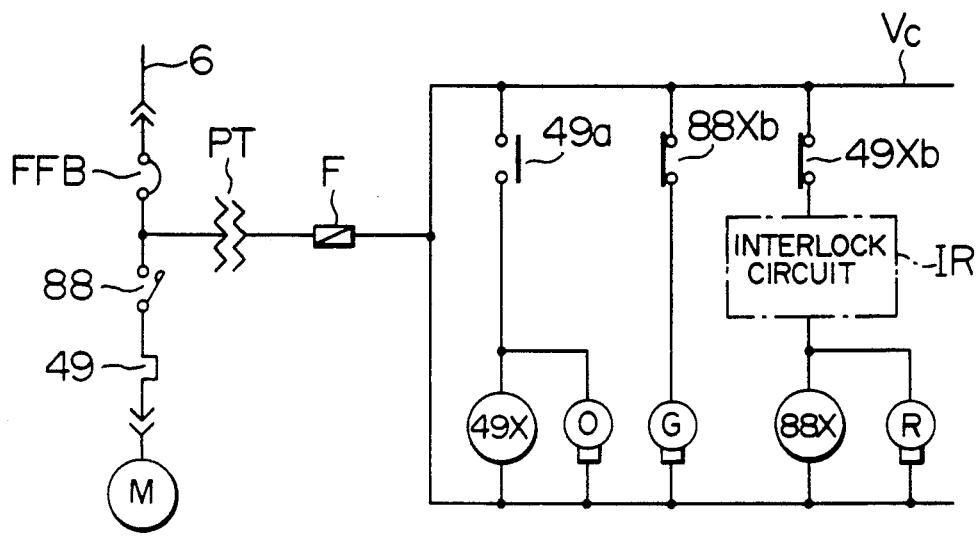
FIGS. 6A and 6B are circuit diagrams showing structures of switchgear apparatuses which can be employed in the distributed plant control system according to the present invention.
Figure 6B:
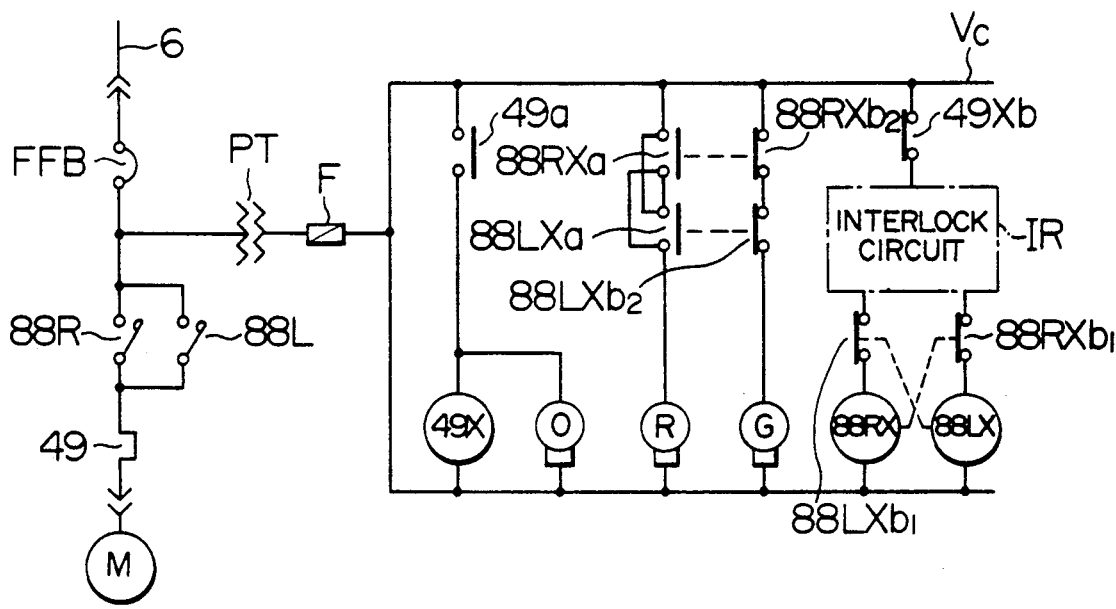

FIGS. 6A and 6B are circuit diagrams showing typical examples of the switchgear unit. More specifically, FIG. 6A shows a structure of the switchgear unit adapted to perform simply the closing/opening of a power supply source, while FIG. 6B shows a structure of the switchgear unit capable of reversibly changing the direction of rotation such as that of a motor driven value.

In FIGS. 6A and 6B, the power supply closing/opening (ON/OFF) control function unit 11(II) shown in FIG. 4 is composed of a fuse-breaker FFB, a switchgear (electromagnetic contactor) 88 and an overload relay 49 to control the power supply to a load M incorporated in the terminal unit 4. A reference symbol $V_c$ represents a control source voltage which can be derived from a part of the power cables 6 through a transformer PT and a fuse F. A circuit to which the control voltage $V_c$ is applied is referred to as the control center mentioned above. In the figures, reference symbol 49a denotes a normally open contact of the overload relay 49, 49X denotes an auxiliary relay energized upon closing of the normally open contact 49a, 49Xb denotes a normally closed contact which is opened upon energization of the auxiliary relay 49X, IR denotes an interlock circuit whose operating conditions are validated by the output signal from the control circuit 11c shown in FIG. 4, and 88X denotes an auxiliary relay energized when the contact 49Xb is closed and when the operating conditions for the interlock circuit are satisfied. Upon energization of this auxiliary relay 88X, the switchgear 88 is closed, while deenergization of the auxiliary relay 88X causes the switchgear 88 to be opened. Further, reference symbol R designates a lamp which is lit during a period in which the switchgear 88 is closed, 88Xb designates a normally closed contact which is opened upon energization of the auxiliary relay 88X, G designates a lamp lit when the switchgear 88 is opened upon closing of the normally closed contact 88Xb, and 0 designates a lamp lit upon closing of the contact 49a to indicate the overload state of the load M. As will be appreciated from the above description, the switchgear 88 remains in the opened state before the power supply to the load M, while the overload relay 49 detects no overload state with the operating conditions for the interlock circuit being unsatisfied. Consequently, the contacts 49Xb and 88Xb are closed while the contact 49a is opened, as the result of which the auxiliary relays 88X and 49X are in the deenergized state with the lamps R and 0 being off. The lamp G is lit to indicate the switchgear 88 is opened. When the conditions for supplying the power to the load M are validated under the command issued from the consolidated field control unit 10 shown in FIG. 3, the interlock circuit IR is changed over to the closed state, whereby the auxiliary relay 88X is energized to close the switchgear 88 while the lamp R is lit to indicate the closing of the switchgear 88. Additionally, energization of the auxiliary relay 88X results in that the lamp G is turned off. When the overload relay 49 is energized, starting from the abovementioned state, the normally open contact 49a is closed, the auxiliary relay 49X is energized (with the lamp 0 being lit), the normally closed contact 49Xb is opened, the auxiliary relay 88X is deenergized (with the lamp R being put off), and the normally closed contact 88Xb is closed (with the lamp G being lit) in this sequence, resulting in that the switchgear 88 is opened. On the other hand, when the operating conditions for the interlock circuit IR is invalidated in the normal closed state of the switchgear 88 in response to the closing command therefor, the auxiliary relay 88X is deenergized (with the lamp R being turned off), while the normally closed contact 88Xb is closed (with the lamp G being turned on), whereby the switchgear 88 is opened.

FIG. 6B shows a structure of the switchgear unit for the field electromechanic unit constituted by a motor driven valve, which differs from that of the switchgear unit shown in FIG. 6A in that two switches 88R and 88L for driving the valve in opposite directions by changing over the phase sequence are provided in combination with the driving auxiliary relays 88RX and 88LX having respective groups of contacts. Further, the lamp R lit during a period in which the load M is driven is lit when either one of the two auxiliary relays 88RX and 88LX is in the energized state, while the lamp G adapted to be lit in the inoperative state of the load M is lit only when both of the auxiliary relays 88RX and 88LX are energized.

With the circuit arrangement described above, the switchgears 88R and 88L are opened before the load M is rotated in the forward or backward direction under power supply. Further, the overload relay 49 detects no overload state while the operating conditions for the interlock circuit IR are not satisfied. Consequently, the contacts 49Xb, 88RXb and 88LXb are closed with the contacts 49a, 88RXa and 88LXa being opened, and the auxiliary relays 88RX, 88LX and 49X are in the deenergized state. The lamps R and 0 are turned off while the lamp G is lit, indicating absence of power supply to the load M.

When the conditions for rotating the load M in the forward direction are validated (with the switch 88R, for example, being closed) under the command issued by the consolidated field control unit 10 shown in FIG. 3, the interlock circuit IR operates to energize the auxiliary relay 88RX, whereby the switch 88R is closed while preventing the auxiliary relay 88LX from being energized by opening the contact 88RXb1. The lamp R is lit in response to the closing of the contact 88RXa, indicating the power supply to the load M. It should be added that energization of the auxiliary relay 88RX brings about the opening of the contact 88RXb2 to thereby turn off the lamp G. Since the operation sequence for driving the load M in the backward direction can easily be appreciated from the above, any further description of this operation will be unnecessary. When the overload relay 49 is activated in the course of the forward rotation of the load M, the contact 49a is closed, the auxiliary relay 49X is energized (with the lamp 0 being turned on), the contact 49Xb is opened, the auxiliary relay 88RX is deenergized, the contact 88RXb1 is closed (with the relay 88LX being released from the energization inhibited state), the contact 88RXb2 is closed (with the lamp G being lit), and the contact 88RXa is opened (with the lamp R being turned off) in this sequence, whereby the switchgear 88R is opened to stop the forward rotation of the motor constituting the load M. When the load or motor M is to be rotated in the backward direction instantaneously upon stoppage thereof in the forward rotation, the forward rotation command to the interlock circuit IR is cleared to open the switch 88R by deenergizing the auxiliary relay 88RX while restoring the contact 88RXb1 to thereby release the auxiliary relay 88LX for the backward rotation from the energization inhibited state, being then followed by application of the command for the rotation in the backward direction from the interlock circuit IR to energize the auxiliary relay 88LX. The succeeding operation will be self-explanatory from the foregoing description without any further elucidation.

Figure 7:
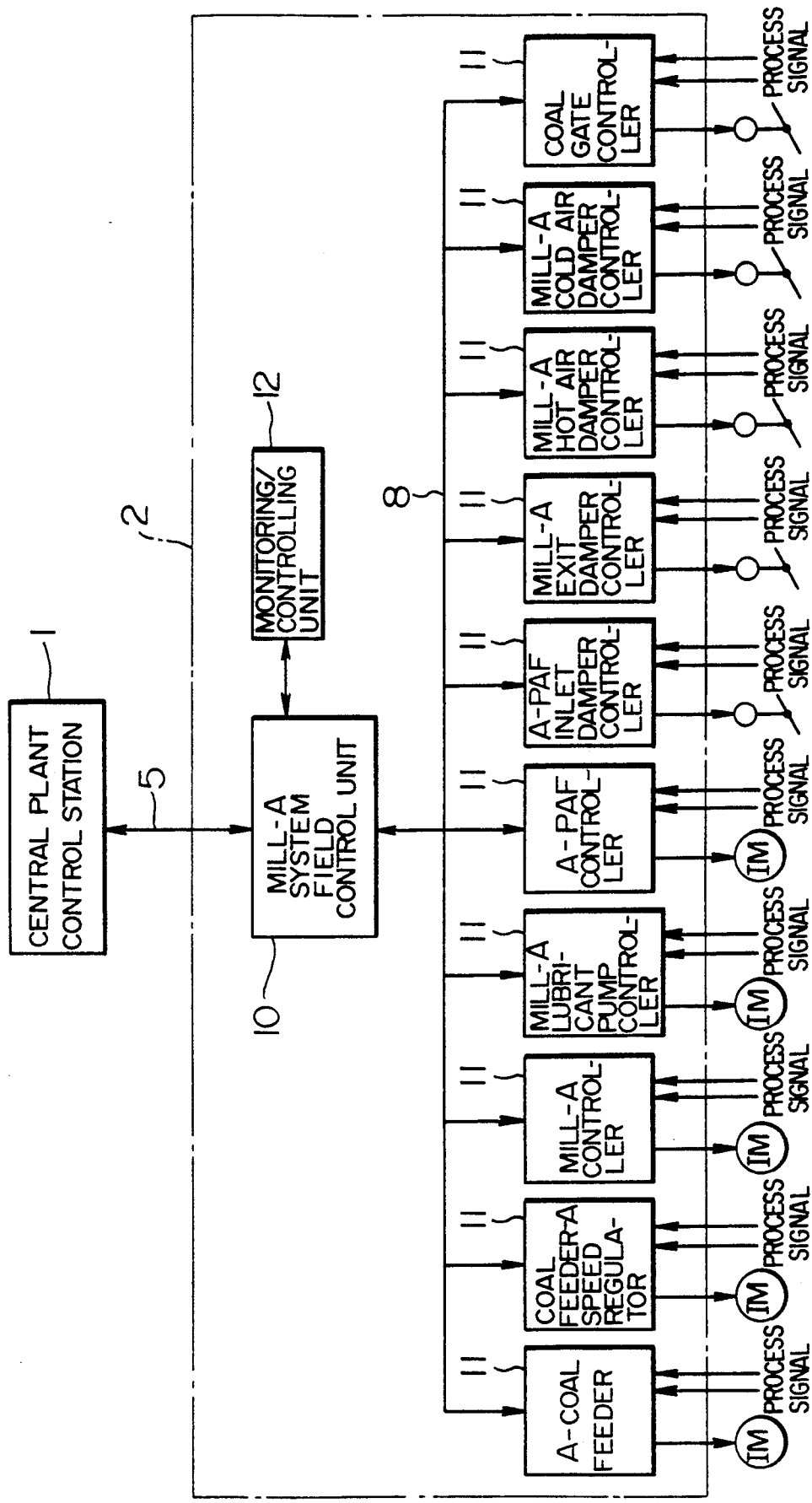
FIG. 7 is a schematic diagram showing a general arrangement of a field control station of the distributed control system according to the invention applied to a thermal power plant.

In the case of a coal fired power plant, the field control station apparatus 2 may be installed in association with each of coal pulverizer mills, as is shown in FIG. 7. In that case, the signals issued to the field control station 2 from the central plant control system 1 through the optical cable 5 include commands for start/stop of the associated pulverizer mill, a command for an amount of coal to be charged in a boiler and others. The operation terminals driven for complying with these commands include, for example, a mill air entrance damper, a mill driving motor, a coal charging feeder drive motor, a mill coal exit damper and others, wherein the operation terminal controller 11 is provided for each of these operation terminals. In the control performed by the operation terminal controllers 11, the process signals relevant to the operation of the operation terminals of concern are inputted to the associated terminal controller 11, wherein information resulting from the signal conditioning and processing in the terminal controller 11 is transmitted through the signal multiplex transmissioncable 8 to the consolidated field control unit 10 and/or other terminal controllers 11 to be utilized therein for the controls performed thereby. Further, from the consolidated field control unit 10, the information is linked up to the central plant control system 1 by way of the optical cables 5. In FIG. 7, a reference numeral 12 denotes an operation monitor/controlling unit. All the information available from the terminal controllers 11 is supplied as the inputs to the consolidated field control unit 10, whereby the operation terminals can be manually operated while monitoring the process signal states as well as the operating states of the associated electromechanical or machine units. In this way, the electromechanical or machine units can be operated under control with only the distributed field control apparatuses 2 even without the aid of the consolidated plant control system 1.

Next, description will be made in detail of a method of distributing the field control apparatuses 2 (each including the consolidated field control unit 10 and the operation terminal controllers 11) in conjunction with a method of grouping the operation terminals by reference to FIGS. 8 to 13. However, operations of the individual machine units of concern per se are well known in the art and thus omitted from description.

FIGS. 8 to 13 show table charts for illustrating the results of classifying the operation terminals for the various machine units into groups in accordance with the major plant processes and on the basis of the functions. More specifically, FIG. 8 shows a group of the operation terminal controllers for the operation terminals of machine units belonging to the mill-A system having a function for transportation and supply of coal (pulverized coal) to a boiler and termed "mill-A controller family" belonging to the mill-A control apparatus. In the actual thermal plant, the functions of the mill system are in general distributed on the six basis (i.e. six machines having the identical function are installed as distributed at six locations). Correspondingly, the field control apparatuses are installed as distributed for the mill families A to F, respectively. In other words, the control apparatuses are automomically distributed. Of these mill families, FIG. 8 shows the contents or terminal controllers belonging to the mill A family which is constituted by a set of the terminal controllers for controlling various units serving for transporting the coal (pulverized coal) to a boiler, wherein the individual units have, respectively, the functions mentioned below:

A-coal feeder: function of feeding coal (pulverizer),
A-coal feeder speed regulator: function of regulating the amount of coal to be charged into the boiler (or mill in a substantially same sense).
A-mill: function of pulverizing coal supplied from the coal feeder,
A-mill lubricant pump: function of supplying lubricant to sliding parts (bearings and the like) of the mill,
A-PAF: function of supplying air for transporting pulverized coal into boiler furnace (referred to as the primary air fan),
A-PAF inlet damper: function of controlling flow of the coal transporting air,
A-mill exit damper: function of interrupting the supply of unnecessary coal into the boiler furnace upon stoppage of boiler or for other reasons,
A-mill hot-air damper, A-mill cold-air damper: function of mixing together hot air and cold air so that the coal transporting air may be at an appropriate temperature, and
Coal gate: function of interrupting the supplying of unnecessary coal to the mill upon stoppage thereof or for other reasons.

When only a part of the abovementioned functions should be lost, the system A can no more perform its role of "transporting and supplying coal to boiler". Owing to this feature as well as the adjacent disposition in the hardware layout, there can be obtained the following effects:

(i) Because distribution of the machine units is at the same level as that of the associated field control apparatus, any failure in this control apparatus will never exert influence to the other system (e.g. B-mill system).

(ii) Amount of cable can be considerably reduced because of short distance between the control apparatus and the field process.

FIG. 9 shows the machine units (terminal units) placed under the control of "A-FDF system control apparatus" and serving for the function of transporting and supplying an appropriate amount of air for combustion which is compatible with the amount of coal supplied to the boiler furnance in cooperation with "B-FDF system control apparatus" (not shown), FIG. 10 shows the machine units (terminal units) placed under the control of "A-IDF system control apparatus" and serving for the function of ensuring stable combustion by maintaining the pressure within the boiler furnance in cooperation with "B-IDF system control apparatus" (not shown), FIG. 11 shows the machine units (terminal units) placed under the control of "feed water pump system-A control apparatus" serving for the function of controlling the water supply to the boiler through a motor drive feed water pump in cooperation with "feed water pump system-B control apparatus" (not shown), FIG. 12 shows the machine units (terminal units) placed under the control of "feed water pump system-C control apparatus" serving for the function to control the water supply to the boiler through a motor driven feed water pump, and FIG. 13 shows the machine units (terminal units) of "turbine control apparatus" serving for driving the turbine by utilizing the work of steam generated by the boiler to generate electric energy. In these figures, the machine or terminal units are groupwise classified through the same grouping procedure as applied to "mill-A control apparatus" described hereinbefore.

In the foregoing description, emphasis is primarily put on the control system architecture. The following description will be directed to the actual application of the control system to a thermal power plant according to an embodiment of the invention.

Figure 14:
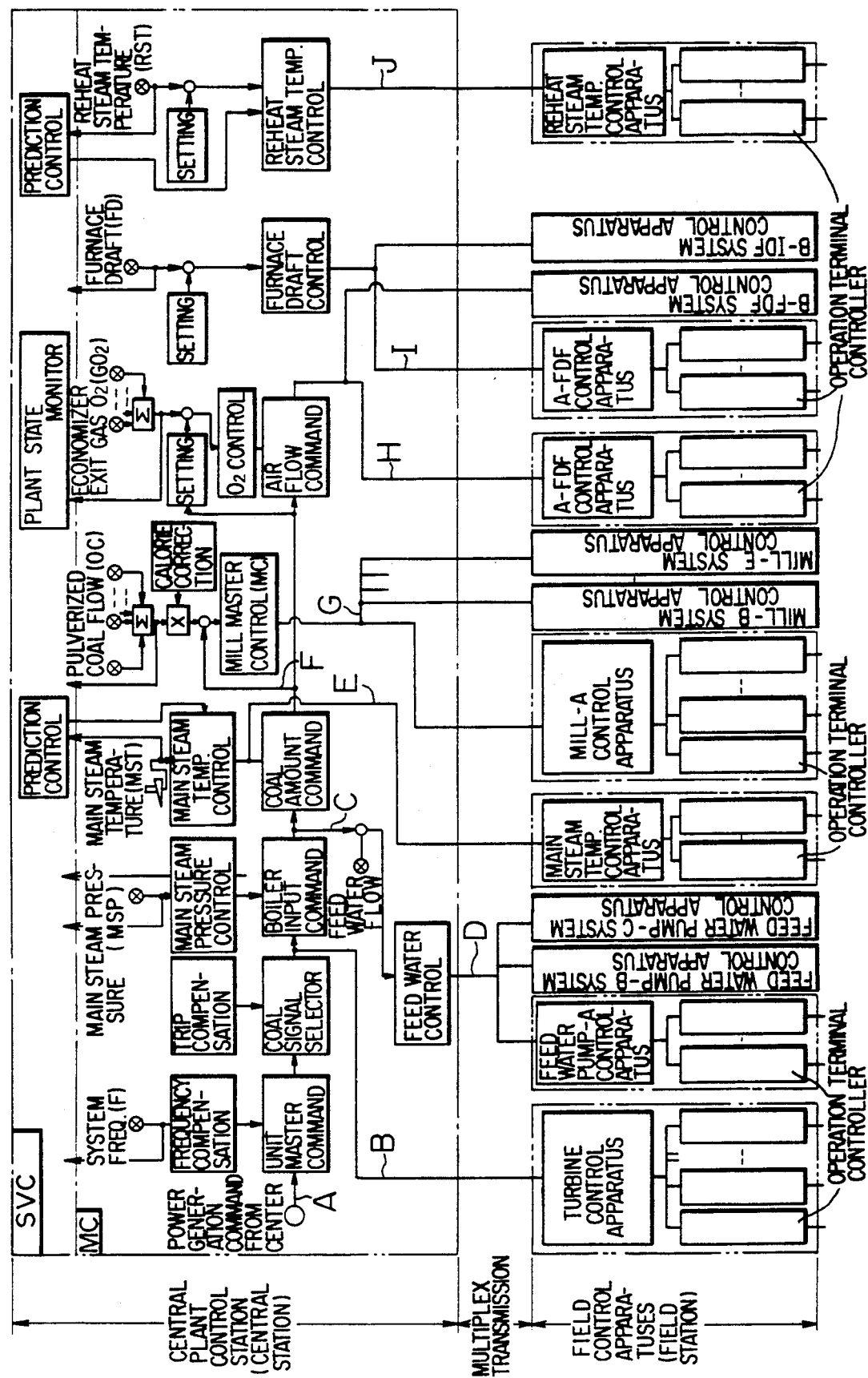
FIG. 14 is a block diagram showing a general arrangement of a control system for controlling groupwise the operation terminals in the plant shown in FIGS. 7 to 13.

FIG. 14 shows a control circuit applied to the thermal power plant systems shown in FIGS. 7 and 8. Referring to these figures together with FIG. 14, when a demand power generation command A is issued as a power supply command by the central control station, a command value B for the main turbine is derived from the demand power generation command A after having been compensated for change in the system frequency F and having been limited in respect to the rate of change in the plant state due to the run-back taking place upon trip of an auxiliary machine of large capacity. The command value B thus derived is supplied to the controller for the turbine.

The command value B mentioned above is additionally used as a boiler input command value. To this end, this command value is corrected such that the main steam pressure MSP be maintained constant. The corrected command value is referred to as a feed water command value. This command value C is then compared with the actual flow of feed water to determine a deviation or difference through PI operation, the resulting deviation being then outputted as a feed water supply command D for the individual feed water pumps to be supplied to the feed water pump controller. Further, on the basis of a command value E for maintaining the main steam temperature MST to be constant, the ratio of the amount of feed water to that of the fuel (coal) is adjusted to generate a command value F for the coal supply and additionally an air supply command value H for maintaining the gas ($O_2$) content to be constant, wherein both command values F and H are supplied to the FDF system control apparatus. The coal feeder command value F is compared with a total fuel amount undergone calorie correction to determine deviation or difference therebetween through PI operation, whereby a mill master command value G is derived to be supplied to the mill system control apparatus for the individual mills. Additionally, a main steam temperature command value E for maintaining constant the main steam temperature, furnance draft and the reheat steam temperature is derived on the basis of the respective set values to be supplied to a main steam temperature control apparatus, while the furnance draft command value I is supplied to an IDF system control apparatus and the reheat steam temperature command J is supplied to the reheat steam temperature control apparatus.

The command values A to J for the main turbine, feed water supply, coal supply, air supply, main steam/reheat steam temperatures and the furnance draft mentioned above are all generated by a master controller MC.

In accordance with these command values A to J, the field control apparatuses distributively installed in the field produce corresponding control commands to the associated terminal units including control valves, control drives and others as well as respective controllers.

In summarization of the foregoing description, it can be said that the distributed control system according to the present invention features the following aspects and advantages:

(1) The individual machines or units in a thermal plant are grouped into sets on the basis of their functions. In that case,
  (i) Differences in the control type such as those among adjusting control, on-off control and others are put aside from consideration, and
  (ii) those machines or units which have same function but belong to the different systems (such as mill system, F-DF system, IDF system and others) are grouped into different sets.

Thus, autonomical distribution of the field-installed control apparatus can be achieved, whereby failure of the machine or unit in a given system can be positively prevented from propagating to the other systems.

(2) Owing to such arrangement that the machines or units are grouped in consideration of the areas where they are installed (i.e. those machines or units located adjacent to one another are grouped into a same set) and that the associated control apparatus of the distributed control system is disposed in the field in the vicinity of that set or group, distance between the grouped machines or units and the associated control apparatus can be shortened, which in turn means that the amount of cable can be significantly reduced.

As will now be appreciated, there can be achieved according to the teachings of the present invention a significant reduction in the amount of cable and the autonomical distribution of the control apparatuses because of the in-field disposition of the control apparatuses on the function and location basis.

Figure 15:
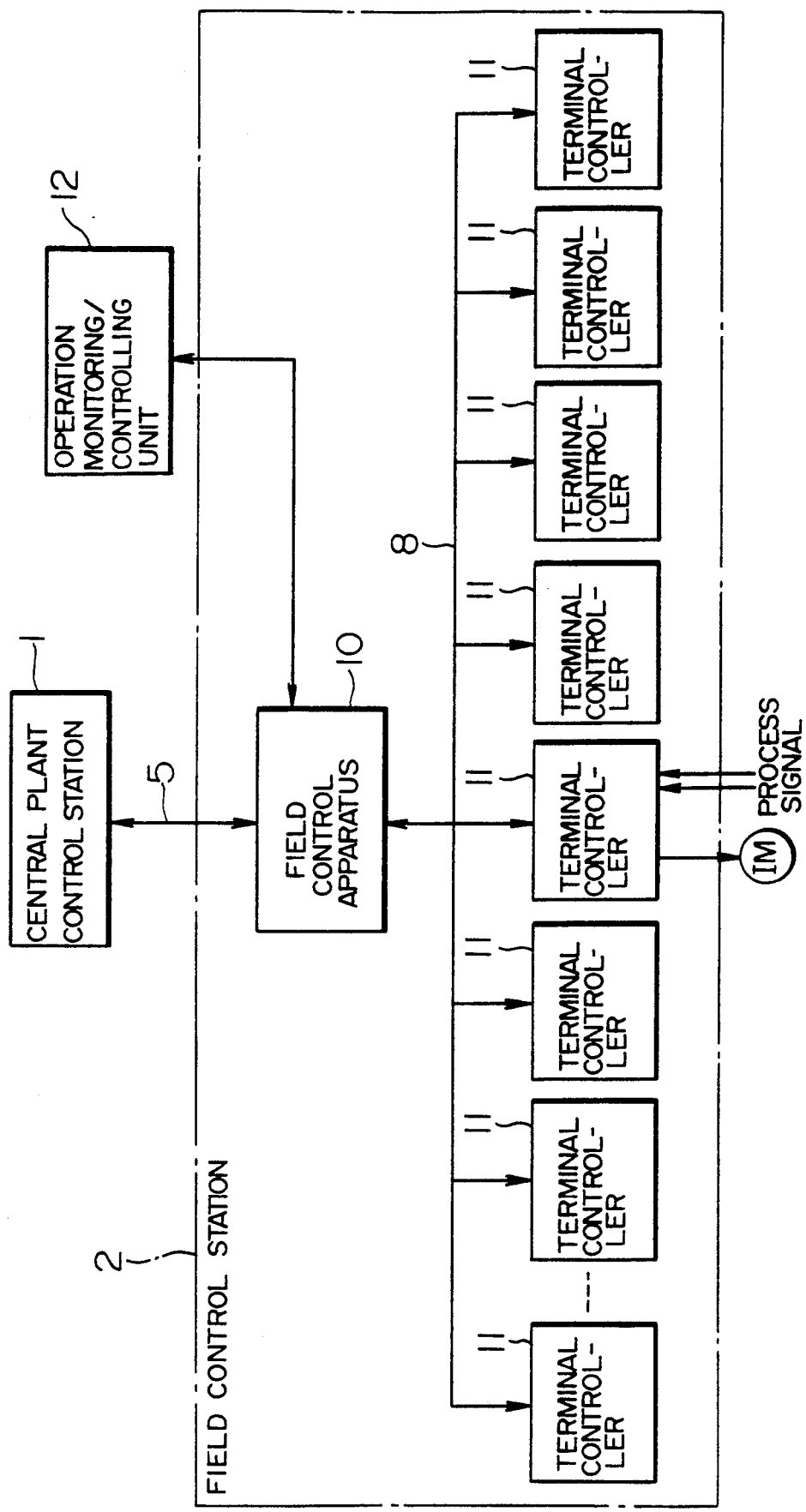
FIG. 15 shows a general arrangement of the distributed control system according to another embodiment of the invention.

FIG. 15 shows the distributed control system according to another embodiment of the present invention which is so arranged that the operation control and monitoring of machines or units can be performed in the field while observing it actually. In FIG. 15, the parts same or equivalent to those shown in FIG. 3 are designated by the same reference numerals, and the following description is directed to those portions which differ from the system shown in FIG. 3. Referring to FIG. 15, a reference numeral 12 denotes an operation monitoring/controlling unit. Since information from all the individual terminal controllers 11 is supplied to the consolidated field control unit 10, manual operation can be carried out by monitoring the states of the process signals and the running states of the machines or units. Thus, operations of the terminal machines or units of the plant can be controlled with only the distributed control system without the aid of the central plant control system.

Next, the operation monitoring/controlling apparatus 12 provided in association with the consolidated field control unit 2 according to the illustrated embodiment will be described in detail by reference to FIGS. 16 to 23.

Figure 16:
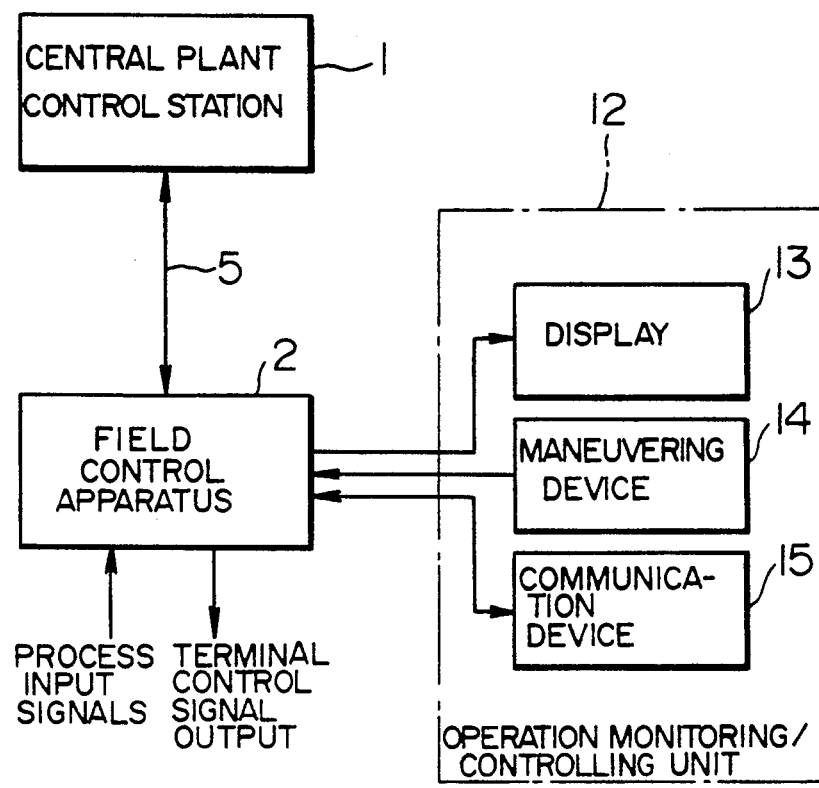
FIG. 16 is a block diagram showing an arrangement of the distributed plant control system according to another embodiment of the invention in which each field control apparatuses is equipped with an operation monitoring and maneuvering unit.

FIG. 16 is a block diagram showing schematically a structure of the operation monitoring/controlling unit 12. As will be seen in the figure, the operation monitoring/controlling unit 12 includes a display 13 for displaying the process states as well as, the running states of mechanical units or machines, a controlling unit 14 for controlling the machines or mechanical units (such as start/stop of pumps and fans, opening/closing of values and others) and additionally a communication device 15 for allowing communication with the central control room and others. The process input signals fetched by the consolidated field control unit 2 are utilized by the internal control circuitries to generate output signals for the terminal units as well as those output signals to be supplied to the central plant control station 1 and the display unit 13. When a machine is to be run for trial in the field or when machine suffering some abnormality is to be serviced in the field, the states of process and the machine are confirmed by viewing the display 13 to control the machine with the aid of the maneuvering unit 14, as occasion requires. Further, when communication with operators resident in the central control room becomes necessary (asking for their help for the job in the field or for the aid in analyzing and determining the causes of abnormality), this can be realized by using the communication device 15.

FIG. 17 shows in more detail a structure layout and functions of the operation monitoring and controlling unit 12. The display device 13 has "process input signal display function" 16 for displaying temperature, pressure, flow and other information, "machine operating state display function" 17 for displaying start/stop of a pump and a fan, valve on/off state and so forth, and "plant control center command display function" 18 for displaying the command signals sent from the central plant control station. The controlling unit 14 has "operation terminal control function" 19. The communication unit 15 has a function 20 for communicating not only with the central control room but also with the field control apparatuses, as described hereinbefore in conjunction with FIG. 16.

Figure 18:
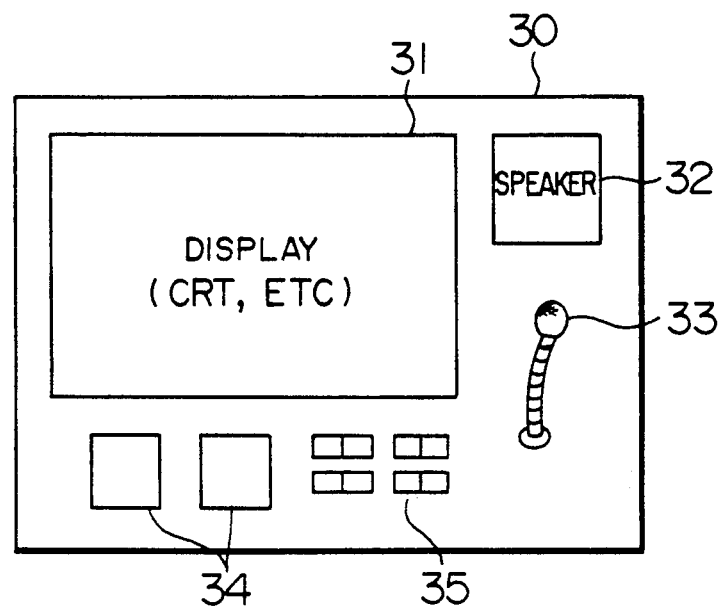
FIG. 18 is a view showing a panel structure of the operation monitoring and maneuvering unit.

FIG. 18 shows, by way of example, a panel structure of the display unit 13 constituting a part of the above-mentioned monitoring/controlling unit 12. The panel 30 includes a display device 31 such as CRT or the like, operating means such as a selector field 34, an operating switch field 35 and a communication means such as a microphone 33, a speaker 32 and others. Thus, field operator can concentratively supervise various process statuses and operation states of various machines or devices and can control machines or devices (operation terminals) while communicating with the central control room, when occasion requires.

Figure 19:
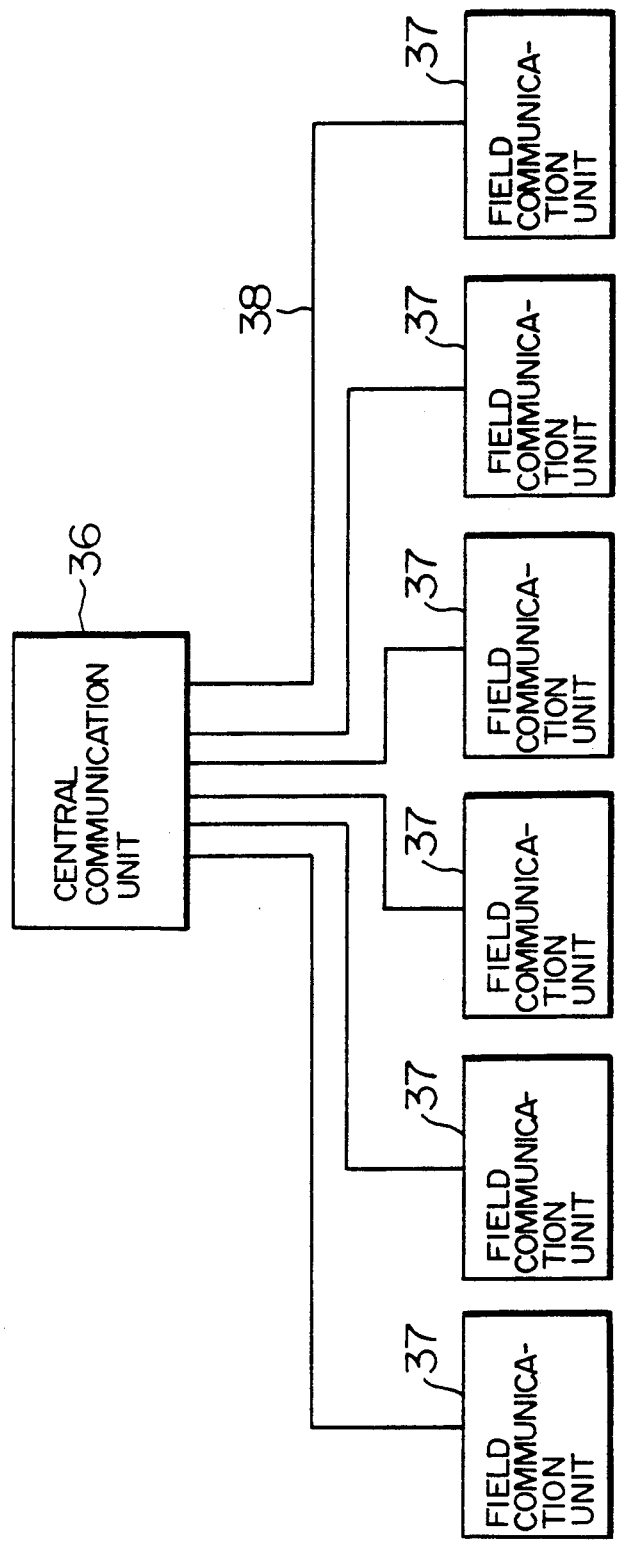
FIGS. 19 to 21 are views showing various possible configurations of a communication system interconnecting the central plant control station and the field control stations.
Figure 20:
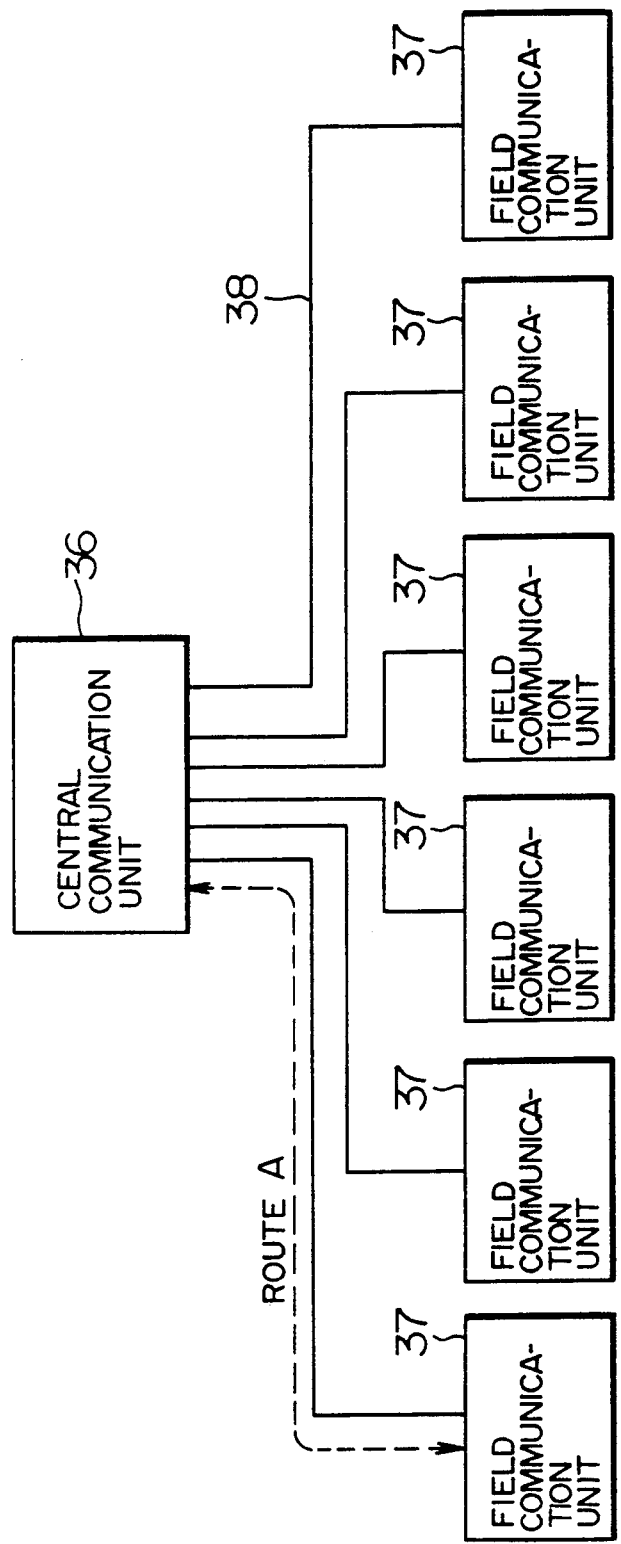
Figure 21:
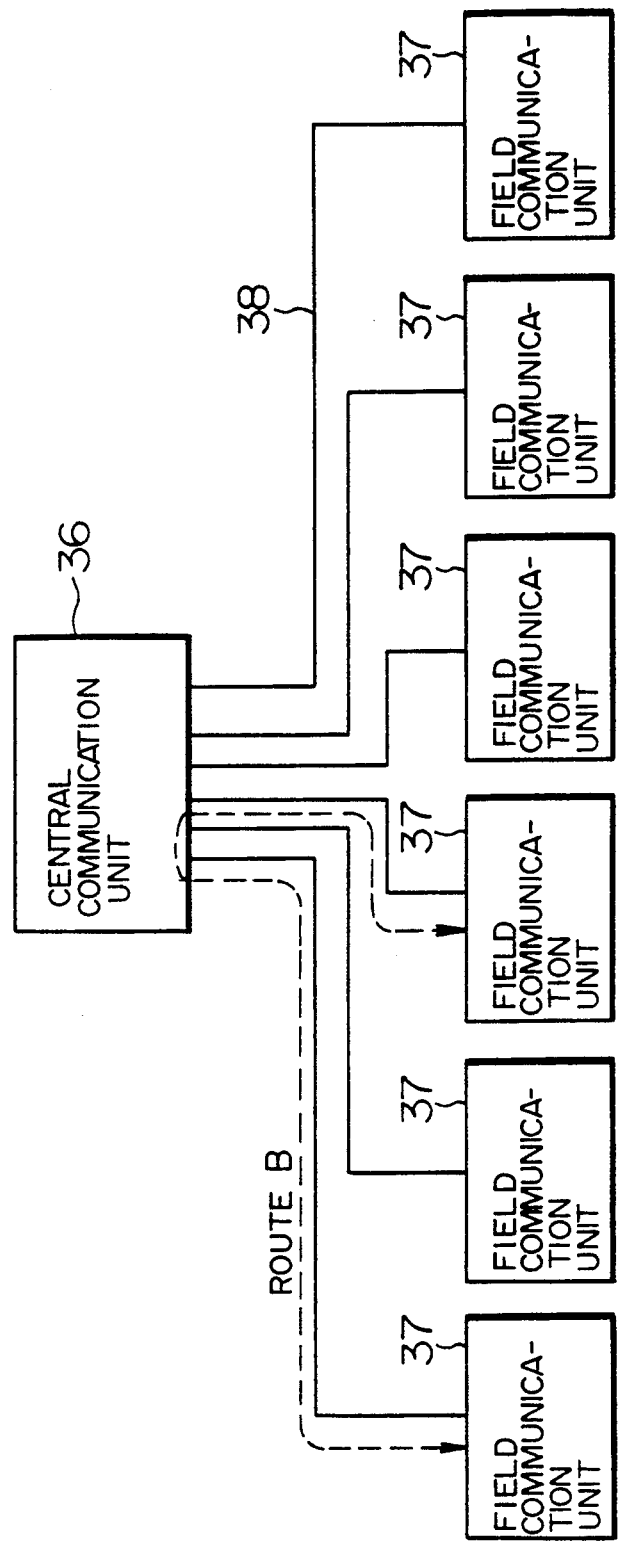

FIG. 19 shows in a block diagram an arrangement of the communication system. The communication unit 15 described hereinbefore by reference to FIGS. 16 to 18 is provided for each of the field control apparatuses or stations and placed under the control of a central communication unit 36. In the case of the paging equipment known heretofore, voice messages are broadcasted over a wide range inclusive of the irrelevant field locations. In contrast, in the communication system according to the invention, the central communication unit can communicate with the requisite minimum number of the field stations by way of a transmission cable 38 (route A) by virtue of the message destination change-over function of the central communication unit, as will be seen in FIG. 20. Additionally, the interfield communication (route B) can be realized by way of the central communication unit 36, as is shown in FIG. 21.

Figure 22:
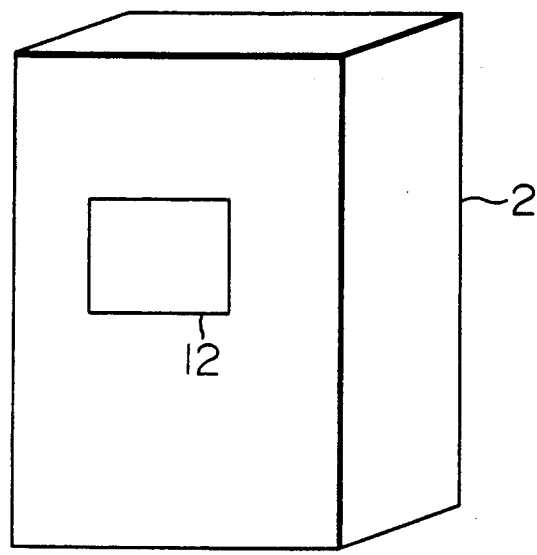
FIGS. 22 and 23 are perspective views showing, respectively, exemplary structures of the operation monitoring/maneuvering unit.
Figure 23:
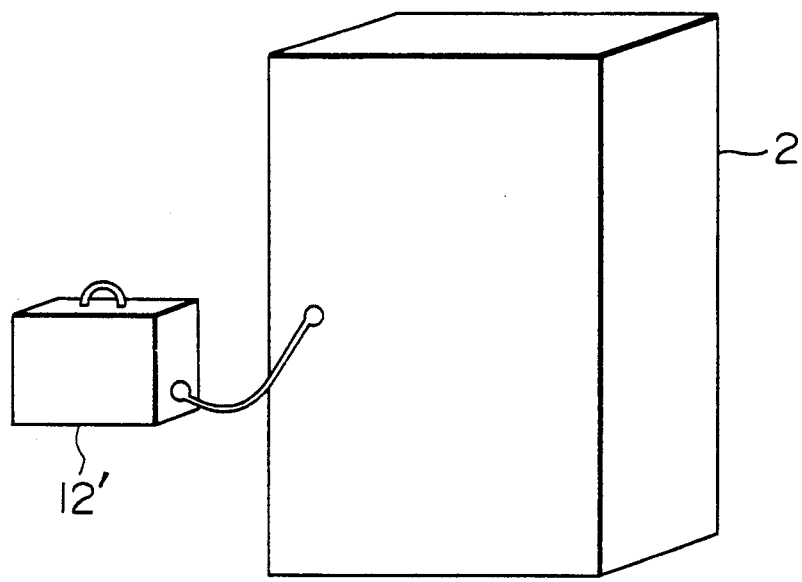

FIGS. 22 and 23 are perspective views showing outer appearances of the operation monitoring/controlling units according to embodiments of the invention, respectively. In the case of the embodiment shown in FIG. 22, the operation monitoring/maneuvering unit 12 is built in the field control apparatus 2, wherein the display/maneuver panel of the unit 12 is exposed externally through a casing of the machine control equipment 12.

On the other hand, the operation maneuver/supervision unit 12' shown in FIG. 23 is implemented in the form of a portable unit and adapted to be separatably connected to the field control apparatus 2. In this connection, it should be mentioned that by designing the portable operation monitoring/maneuvering unit 2 so as to be used in common to a plurality of the field control apparatuses 2, significant cost reduction can be achieved. Further, in view of the fact that a plurality of the terminal units can be placed under the control of the single field control apparatus, the connecting receptacle for the operation monitoring/maneuvering unit 12' may be mounted not only in the field control apparatus 2 but also for each of the individual units of the plant in the vicinity thereof for allowing the monitoring and/or maneuvering thereof to be performed on the unit basis in a relatively straightforward manner.

According to the system in which the operation monitoring/maneuvering unit described above is employed, man-machine communication can be rapidly, smoothly and easily established with high response rate for the machines or devices (or units in a more general term) placed under the control of the field control apparatuses which can be consolidated by the central control station to great advantage for practical applications.

We claim:

1. A distributed control system for a thermal power plant comprising:
   a steam turbine;
   an electric generator operatively coupled to said steam turbine to generate electric power;
   an electric power system receiving outputs of said electric generator through a transformer;
   a plurality of field apparatuses for keeping said steam turbine and said electric generator operating, constituting parts of said plant, said field apparatuses being correspondingly installed in a plurality of fields, said fields being sections of said plant;
   power supply equipment for receiving electric power from said electric power system and for supplying said electric power to said plurality of field apparatuses;
   a plurality of operation terminals correspondingly installed in said fields in association with said field apparatuses for controlling the electric power supplied from said power supply equipment to said field apparatuses associated with said operation terminals thereby controlling operation of said field apparatuses, respectively;
   a plurality of control apparatuses each installed in a corresponding field for controlling a field apparatus installed in said corresponding field so that said field apparatus installed in said corresponding field is set to respective desired operating states;
   a general plant control station, connected to each of said plurality of control apparatuses by signal transmission lines, for controlling said plurality of control apparatuses in a consolidated manner according to signals transmitted on said lines;
   wherein each of said plurality of operation terminals receives process signals from an associated field apparatus and transmits said process signals to said general plant control station, and said plurality of control apparatuses respectively control said operation terminals installed in said associated fields;
   a plurality of switches corresponding to said field apparatuses, each switch switches off electric power to a corresponding field apparatus when a current overload condition is detected in said corresponding field apparatus, said each switch being disposed near said corresponding field apparatus; and
   operation monitoring/controlling means associated with each of said plurality of control apparatuses for controlling the associated field apparatus independent of the control performed by said general plant control station and, optionally, monitoring the associated field apparatus.

2. A distributed control system for a thermal power plant according to claim 1, wherein at least one of said fields has at least one of said apparatuses installed therein.

3. A distributed control system for a thermal power plant according to claim 1, wherein at least one of said fields has a plurality of said field apparatuses installed therein.

4. A distributed control system for a thermal power plant according to claim 1, wherein at least one of said field apparatuses is supplied with electric power from said power supply equipment by way of one associated operation terminal.

5. A distributed control system for a thermal power plant according to claim 1, wherein at least one of said field apparatuses is supplied with electric power from said power supply equipment by way of a plurality of said operation terminals.

6. A distributed control system for a thermal power plant according to claim 1, wherein at least one of said control apparatuses controls one of said operation terminals.

7. A distributed control system for a thermal power plant according to claim 1, wherein at least one of said control apparatuses controls a plurality of said operation terminals.

8. A distributed control system for a thermal power plant according to claim 1, wherein a plurality of operation terminals are installed in at least one of said fields.

9. A distributed control system for a thermal power plant according to claim 8, wherein said control apparatus includes a plurality of operation terminal controllers for controlling said plurality of operation terminals, respectively, and a consolidated control unit for controlling said plurality of operation terminal controllers in a consolidated fashion.

10. A distributed control system for a thermal power plant according to claim 1, wherein at least one of said operation terminals and one of said control apparatuses in said corresponding field form a plurality of switchgear units each being disposed in said corresponding field for controlling at least one field apparatus installed in said corresponding field such that said at least one field apparatus is set to a required operating state through energization by the electric power supplied from said power supply equipment.

11. A distributed control system for a thermal power plant according to claim 10, wherein at least one of said fields has a plurality of swtichgear units installed therein.

12. A distributed control system for a plant according to claim 11, further including a control unit disposed in the field equipped with said plurality of swtichgear units for controlling said switchgear units.

13. A distributed control system for a thermal power plant according to claim 1, wherein said power supply equipment further includes a plurality of power supply buses at least one of which is supplied with electric power, at least one transformer and at least one swtichgear provided between said power supply bus supplied with electric power and the other power supply buses, said system further comprising:
a plurality of cables led out from said plurality of power supply buses, respectively, for supplying electric power to said plurality of field apparatuses installed in said plurality of fields.

14. A distributed control system for a thermal power plant according to claim 1, wherein said operation monitoring/controlling means includes display means for displaying operation state of the associated field apparatus and controlling means for controlling operation of said field apparatus.

15. A distributed control system for a thermal power plant according to claim 1, further including at least one communication unit installed between said general plant control station and at least one of said control apparatuses.

16. A distributed control system for a thermal power plant according to claim 15, wherein said operation monitoring/controlling mans equipped with communication means is implemented in a structure capable of communicating with the other control apparatuses by way of said general plant control station.

17. A distributed control system for a thermal power plant according to claim 1, wherein said operation monitoring/controlling means is incorporated in said control apparatus.

18. A distributed control system for a thermal power plant according to claim 1, wherein said operation monitoring/controlling means is implemented in a structure to be detachably connected to the field apparatus.

19. A distributed control system for a plant according to claim 1, wherein said power supply equipment further includes a plurality of power supply buses at least one of which is supplied with electric power, at least one transformer and at least one switchgear provided between said power supply bus supplied with electric power and the other power supply buses, said system further comprising:
a plurality of cables led out from said plurality of power supply buses, respectively, for supplying electric power to said plurality of field apparatuses installed in said plurality of fields.

20. A distributed control system for a thermal power plant according to claim 1, wherein said power supply equipment comprises buses and transformers for conducting electric power to said field apparatuses.

21. A distributed control system for a thermal power plant according to claim 1, wherein said general plant control station, connected to each of said plurality of control apparatuses, systematically transmits operating command signals and operating information to and from said plurality of field apparatuses, respectively.

22. A distributed control system for a thermal power plant according to claim 1, wherein a power supply terminal of any of said plurality of switches is directly connected to one of said busses of said power supply equipment, and a load said terminal of said switch is connected to one of said plurality of field apparatuses.

23. A distributed control system for a thermal power plant according to claim 1, wherein said plurality of field apparatuses are automatically distributed throughout said plurality of fields.

24. A distributed control system for a thermal power plan comprising:
a steam turbine;
an electric generator operatively coupled to said steam turbine to generate electric power;
an electric power system receiving outputs of said electric generator through a transformer;
an electrical equipment room receiving electric power from said electric power system, including a plurality of power supply buses whose power levels are different from one another, said buses being connected with a power system;
a control station including a central plant control station for controlling said plant in a consolidated manner;
a field including a plurality of electromechanical units, a plurality of power cables for connecting said electromechanical units with said buses in said electrical equipment room corresponding to the power levels to be used by said electromechanical units, respectively, a plurality of switching means, each of which is connected in one of said power cables at a position near to an electromechanical unit corresponding to one of said power cables, said each switching means witches off power supplied to said electromechanical unit when a current overload condition is detected in said electromechanical unit, a plurality of control means, each control means connected between said central plant control station and an electromechanical unit in said field, for controlling operating states of said electromechanical unit and transmitting a process signal to said central plant control station, said field being a section of said plant; and
operation monitoring control means associated with each of said plurality of control mans for controlling the associated electromechanical unit independent of the control performed by said central plant control station, optionally monitoring the associated electromechanical unit and controlling na operation terminal installed in said field in line with the associated power cable, said operation terminal controls operation of said electromechanical unit by controlling said electrical power being supplied thereto and transmitting process signals from the associated electromechanical unit to said control station.

25. A distributed control system for a thermal power plant, comprising:

a steam turbine;

an electric generator operatively coupled to said steam turbine to generate electric power;

an electric power system receiving outputs of said electric generator through a transformer;

a plurality of field apparatuses for keeping said steam turbine and said electric generator operating, constituting parts of said plant, said field apparatuses being correspondingly installed in a plurality of fields, said fields being sections of said plant;

power supply equipment for receiving electric power from said electric power system and for supplying the electric power to said plurality of field apparatuses;

a plurality of operation terminals correspondingly installed in said fields in association with said field apparatuses for controlling the electric power supplied from said power supply equipment to said field apparatuses associated with said operation terminals respectively;

a plurality of control apparatuses, each installed in a corresponding field for controlling a field apparatus installed in said corresponding field so that said field apparatus installed in said corresponding field is set to respective desired operating states;

a general plant control station, connected to each of said plurality of control apparatuses by signal transmission lines, for controlling said plurality of control apparatuses in a consolidated manner according to signal transmitted on said lines;

wherein each of said plurality of operation terminals receives process signals from an associated field apparatus and transmits said process signals to said general plant control station, and said plurality of control apparatuses respectively control said operation terminals installed in said associated fields;

a plurality of switches corresponding to said field apparatuses, each switch switches off electric power to a corresponding field apparatus when a current overload condition is detected in said corresponding field apparatus, said each switch being disposed near said corresponding field apparatus; and operation monitoring/controlling means associated with each of said plurality of control apparatuses for controlling the associated field apparatus independent of the control performed by said general plant control station and optionally monitoring the associated field apparatus.

26. A distributed control system for a thermal power plant, comprising:

a steam turbine;

an electric generator operatively coupled to said steam turbine to generate electric power;

an electric power system receiving outputs of said electric generator through a transformer;

an electrical equipment room receiving power from said electric power system, including a plurality of power supply buses whose power levels are different from one another, said buses being connected with a power system;

a control station including a central plant control station for controlling said plant in a consolidated manner;

a field including a plurality of electromechanical units, a plurality of power cables for connecting said electromechanical units with said buses in said electrical equipment room corresponding to the power levels to be used by said electromechanical units, respectively, a plurality of switching means, each of which is connected in one of said power cables at a position near to an electromechanical unit corresponding to one of said power cables, said each switching means switches off power supplied to said electromechanical unit when a current overload condition is detected in said electromechanical unit, a plurality of control means, each control means connected between said central plant control station and an electromechanical unit in said field, for controlling operating states of said electromechanical nit and transmitting a process signal to said central plant control station, said field being a section of said plant; and operation monitoring/controlling means associated with each of said plurality of control means for controlling the associated electromechanical unit independent of the control performed by said central plant control station, optionally monitoring the associated electromechanical unit and controlling an operation terminal installed in said field in line with the associated power cable, said operation terminal controls operation of said electromechanical unit by controlling said electrical power being supplied thereto and transmitting process signals from said electromechanical unit to said control station.

* * * * *